United States Patent
Chen et al.

(10) Patent No.: US 12,405,415 B2
(45) Date of Patent: Sep. 2, 2025

(54) FRONT LIGHT SOURCE MODULE AND DISPLAY APPARATUS

(71) Applicants: Beijing BOE Display Technology Co., Ltd., Beijing (CN); BOE Technology Group Co., Ltd., Beijing (CN)

(72) Inventors: Xiuyun Chen, Beijing (CN); Tingxiu Hou, Beijing (CN); Lingyu Sun, Beijing (CN); Peng Zhong, Beijing (CN); Qirui Tan, Beijing (CN); Xibin Shao, Beijing (CN); Site Cai, Beijing (CN); Guangquan Wang, Beijing (CN); Chaoyue Zhao, Beijing (CN); Ziyan Zhang, Beijing (CN); Jingjun Du, Beijing (CN); Qianqian Hao, Beijing (CN); Yaxin Sun, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/688,947

(22) PCT Filed: Jul. 31, 2023

(86) PCT No.: PCT/CN2023/110351
§ 371 (c)(1),
(2) Date: Mar. 4, 2024

(87) PCT Pub. No.: WO2024/066721
PCT Pub. Date: Apr. 4, 2024

(65) Prior Publication Data
US 2025/0067920 A1 Feb. 27, 2025

(30) Foreign Application Priority Data

Sep. 27, 2022 (CN) .................... CN202211183113.0

(51) Int. Cl.
*F21V 8/00* (2006.01)

(52) U.S. Cl.
CPC .......... *G02B 6/0036* (2013.01); *G02B 6/003* (2013.01); *G02B 6/0078* (2013.01); *G02B 6/0083* (2013.01); *G02B 6/0091* (2013.01)

(58) Field of Classification Search
CPC .... G02B 6/0036; G02B 6/003; G02B 6/0078; G02B 6/0083; G02B 6/0091
See application file for complete search history.

(56) References Cited

U.S. PATENT DOCUMENTS

2002/0054258 A1   5/2002   Kondo et al.
2002/0060772 A1   5/2002   Umemoto et al.
(Continued)

FOREIGN PATENT DOCUMENTS

CN   1381752 A   11/2002
CN   1384392 A   12/2002
(Continued)

*Primary Examiner* — Donald L Raleigh
(74) *Attorney, Agent, or Firm* — Nath, Goldberg & Meyer; Joshua B. Goldberg

(57) ABSTRACT

A front light source module is provided to include a side light source; a light guide layer with a light incident side opposite to the side light source in a first direction; and a first light adjusting layer, the first light adjusting layer and the light guide layer are stacked in a third direction, a portion of the first light adjusting layer away from the light guide layer is provided with micro-groove structures, each including: a first inclined surface and a second inclined surface opposite to each other in the first direction, the first inclined surface is configured to face the light incident sid, closer to the light incident side than the second inclined surface, angle α between the first inclined surface and a plane where a surface of the first light adjusting layer away from the light guide layer is located is in a range from 26° to 42°.

16 Claims, 17 Drawing Sheets

(56) References Cited

U.S. PATENT DOCUMENTS

| | | | | |
|---|---|---|---|---|
| 2019/0064422 A1* | 2/2019 | Kim | ................. | G02B 6/0053 |
| 2021/0373225 A1* | 12/2021 | Yao | ................. | G02B 6/0055 |
| 2022/0373731 A1* | 11/2022 | Chen | ................. | G02B 6/0053 |

FOREIGN PATENT DOCUMENTS

| CN | 1416000 | A | 5/2003 |
|---|---|---|---|
| CN | 1834754 | A | 9/2006 |
| CN | 110967869 | A | 4/2020 |
| CN | 212434126 | U | 1/2021 |
| CN | 112987410 | A | 6/2021 |
| CN | 113050328 | A | 6/2021 |
| CN | 113311530 | A | 8/2021 |
| CN | 113763806 | A | 12/2021 |

\* cited by examiner

FRONT LIGHT SOURCE MODULE AND DISPLAY APPARATUS

This is a National Phase Application filed under 35 U.S.C. 371 as a national stage of PCT/CN2023/110351, filed Jul. 31, 2023, an application claiming the benefit of Chinese Application No. 202211183113.0, filed Sep. 27, 2022, the content of each of which is hereby incorporated by reference in its entirety.

TECHNICAL FIELD

The present disclosure relates to the field of display technology, and in particular to a front light source module and a display apparatus.

BACKGROUND

At present, under the market trend that the outdoor display and the motion display are more and more favored, panel manufacturers invest most energy in designing a low power consumption display product which may utilize outdoor environment light to display, and a reflective display panel is emerged.

The reflective display panel realizes the display by using a reflective layer (a metal layer with a reflecting function) in the reflective display panel to reflect the ambient light, which does not include a backlight source, and has the advantages of low power consumption, lightweight and thinness and the like. However, when the ambient light is relatively weak, the reflective display product needs an additional light source to assist in the display. Therefore, a development of a front light source module applicable to the reflective display panel has become a new research direction in the display field.

SUMMARY

In a first aspect, embodiments of the present disclosure provide a front light source module, including: a side light source; a light guide layer including a light incident side opposite to the side light source in a first direction; and a first light adjusting layer, wherein the first light adjusting layer and the light guide layer are stacked in a third direction, a portion of the first light adjusting layer away from the light guide layer is provided with a plurality of micro-groove structures, each micro-groove structure includes: a first inclined surface and a second inclined surface opposite to each other in the first direction, the first inclined surface is configured to face the light incident side and is closer to the light incident side than the second inclined surface, an angle α between the first inclined surface and a plane where a surface of the first light adjusting layer away from the light guide layer is located is in a range from 26° to 42°, and a depth H of each micro-groove structure is in a range from 4 μm to 15 μm; wherein a refractive index of the first light adjusting layer is greater than or equal to that of the light guide layer.

In some embodiments, a length of an opening of each micro-groove structure in the surface of the first light adjusting layer away from the light guide layer in the first direction is $L_1$; and a ratio of L1 to H is L1/H, which satisfies: $L_1/H \leq 4$.

In some embodiments, $L_1$ satisfies $L_1 \leq 80$ μm.

In some embodiments, the first inclined surface is rectangular, a pair of opposite sides of the rectangular first inclined surface extend along a second direction, and the second direction is perpendicular to both the first direction and the third direction; and an extending direction of the other pair of opposite sides of the rectangular first inclined surface is perpendicular to the third direction, and intersects with both the first direction and the second direction.

In some embodiments, a length $L_2$ of a side of the rectangular first inclined surface extending in the second direction satisfies: $L_2 \leq 80$ μm.

In some embodiments, a shape of a cross section of each micro-groove structure taken along a plane parallel to the first direction and parallel to the third direction includes: a triangle or a quadrangle.

In some embodiments, the second inclined surface is a flat surface or a curved surface.

In some embodiments, a distribution density of the plurality of micro-groove structures increases gradually in a direction away from the light incident side along the first direction starting from the light incident side.

In some embodiments, the surface of the first light adjusting layer away from the light guide layer is divided into a plurality of groove structure arrangement regions arranged along the first direction; a distance between every two adjacent groove structure arrangement regions gradually decreases in the direction away from the light incident side along the first direction starting from the light incident side; each groove structure arrangement region is divided into a plurality of rectangular periodic regions in the second direction; a length of each rectangular periodic region in the first direction is R, and a length of each rectangular periodic region in the second direction is Q; and M micro-groove structures are uniformly arranged in each rectangular periodic region.

In some embodiments, the M micro-groove structures in each rectangular periodic region are arranged to satisfy: a distance between centers of any two micro-groove structures in the first direction is greater than or equal to R/M, and a distance between the centers of any two micro-groove structures in the second direction is greater than or equal to Q/M.

In some embodiments, the side light source includes: a light source; and a converging structure between the light source and the light incident side and configured to converge the light emitted from the light source in the third direction, wherein an angle θ1 between the light emitted from the converging structure and a first reference plane satisfies: $\theta 1 \leq 52.4°$, and the first reference plane is a plane perpendicular to the third direction.

In some embodiments, the converging structure includes: a wedge-shaped light guiding structure; the wedge-shaped light guiding structure includes: a first light incident surface, a first light outgoing surface, a first light adjusting surface and a second light adjusting surface; the first light incident surface and the first light outgoing surface are opposite to each other in the first direction, both the first light incident surface and the first light outgoing surface are perpendicular to the first direction, a length of the first light incident surface in the third direction is T1, a length of the first light going surface in the third direction is T2, T2>T1, and an orthographic projection of the first light going surface on a plane where the first light incident surface is located covers the first light incident surface; the first light adjusting surface and the second light adjusting surface are opposite to each other in the third direction, and a distance between the first light adjusting surface and the second light adjusting surface in the third direction is gradually increased in a direction from the first light incident surface to the first light outgoing surface along the first direction; and the light source is opposite to the first light incident surface, and the light incident side is opposite to the first light outgoing surface.

In some embodiments, the light source includes: a driving board and a light emitting element fixed on the driving board, a length T of the light emitting element in the third direction is smaller than the length T1 of the first light incident surface in the third direction; and an orthographic projection of the light emitting element on the plane where the first light incident surface is located in a region defined by the first light incident surface.

In some embodiments, the length T of the light emitting element in the third direction satisfies: T≤0.3 mm.

In some embodiments, the wedge-shaped light guiding structure and the light guide layer are made of a same material and have a one-piece structure; and the light incident side and the first light outgoing surface are a same surface.

In some embodiments, the converging structure includes a condenser lens.

In some embodiments, a shape of a cross section, taken along a plane perpendicular to the second direction, of a surface of the condenser lens away from the light source is a circular arc; or a shape of a cross section, taken along a plane perpendicular to the second direction, of a surface of the condenser lens away from the light source is a curve formed by connecting circular arcs and line segments sequentially and alternately.

In some embodiments, the light source includes: a driving board and a light emitting element fixed onto the driving board, and the condenser lens is on the driving board and covers the light emitting element.

In some embodiments, the front light source module further includes a plurality of light converging micro-structures on a surface of the light guide layer away from the first light adjusting layer, and configured to converge light passing through the plurality of light converging micro-structures from the light guide layer.

In some embodiments, each light converging micro-structure is a light converging groove on the surface of the light guide layer away from the first light adjusting layer, and the light converging groove extends along the second direction; and a cross section, taken along a plane perpendicular to the second direction Y, of a surface of the light converging groove is V-shaped or arc-shaped.

In some embodiments, a length $L_3$ of the light converging groove in the first direction satisfies: $L_3 \le 80$ μm.

In some embodiments, the front light source module further includes at least one second light adjusting layer on a side of the light guide layer away from the first light adjusting layer, wherein the at least one second light adjusting layer and the light guide layer are stacked in the first direction, and the at least one second light adjusting layer includes light adjusting micro-structures thereon and configured to adjust an exit angle of light emitted from the surface of the light guide layer away from the first light adjusting layer and passing through the light adjusting micro-structures.

In some embodiments, the light emitted from the light guide layer away from the first light adjusting layer propagates in a direction away from a plane where the light incident side is located; the light adjusting micro-structures arranged on the at least one second light adjusting layer include: a first light adjusting micro-structure configured so that the light emitted from the surface of the light guide layer away from the first light adjusting layer and passing through the first light adjusting micro-structure still propagates in the direction away from the plane where the light incident side is located, but an angle between the light and the third direction increases; and/or the light adjusting micro-structures arranged on the at least one second light adjusting layer include: a second light adjusting micro-structure configured so that the light emitted from the surface of the light guide layer away from the first light adjusting layer and passing through the second light adjusting micro-structure still propagates in the direction away from the plane where the light incident side is located, but the angle between the light and the third direction decreases; and/or the light adjusting micro-structures arranged on the at least one second light adjusting layer include: a third light adjusting micro-structure configured so that the light emitted from the surface of the light guide layer away from the first light adjusting layer and passing through the third light adjusting micro-structure propagates in a direction close to the plane where the light incident side is located.

In some embodiments, a refractive index of a second light adjusting layer closest to the light guide layer is greater than or equal to the refractive index of the light guide layer.

In some embodiments, the at least one second light adjusting layer includes two or more second light adjusting layers; and a refractive index of one of any two adjacent second light adjusting layers closer to the light guide layer is less than or equal to a refractive index of the other second light adjusting layer.

In some embodiments, the first light adjusting layer is attached to the light guide layer by a first attaching adhesive layer, and a refractive index of the first attaching adhesive layer is greater than or equal to the refractive index of the light guide layer and is less than or equal to the refractive index of the first light adjusting layer.

In some embodiments, the first light adjusting layer is made of a nano-imprint material.

In a second aspect, an embodiment of the present disclosure further provides a display apparatus, including: a reflective display panel and the front light source module in the first aspect; the front light source module is located on a light outgoing surface of the reflective display panel.

In some embodiments, the reflective display panel includes a plurality of sub-pixel regions arranged in an array along a first direction and a second direction, and each sub-pixel region has a length $L_0$ in the first direction; and a length of each micro-groove structure in the first direction is less than or equal to $\frac{2}{3} \times L_0$, and a length of each micro-groove structure in the second direction is less than or equal to $\frac{2}{3} \times L_0$.

In some embodiments, the display apparatus further includes a plurality of light converging micro-structures on a surface of the light guide layer away from the first light adjusting layer, and configured to converge light passing through the plurality of light converging micro-structures from the light guide layer; wherein a length of each light converging micro-structure in the first direction is less than or equal to $\frac{2}{3} \times L_0$.

In some embodiments, the display apparatus further includes at least one second light adjusting layer on a side of the light guide layer away from the first light adjusting layer, wherein the at least one second light adjusting layer and the light guide layer are stacked in the first direction, and the at least one second light adjusting layer includes light adjusting micro-structures thereon and configured to adjust an exit angle of light emitted from the surface of the light guide layer away from the first light adjusting layer and passing through the light adjusting micro-structures; wherein a length of each light adjusting micro-structure in the first direction is less than or equal to $\frac{2}{3} \times L_0$.

In some embodiments, the front light source module and the reflective display panel are attached to each other by a second attaching adhesive layer; and a refractive index of a portion of the front light source module in contact with the second attaching adhesive layer is greater than a refractive index of the second attaching adhesive layer.

DETAIL DESCRIPTION OF EMBODIMENTS

In order to enable one of ordinary skill in the art to better understand the technical solutions of the present disclosure, a front light source module and a display apparatus provided by the present disclosure will be described in further detail with reference to the accompanying drawings.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like means that the element or item preceding the term contains the element or item listed after the term and its equivalent, but does not exclude other elements or items. The terms "upper", "lower", "left", "right", and the like are used only for indicating relative positional relationships, and when the absolute position of an object being described is changed, the relative positional relationships may also be changed accordingly.

Figure 1:
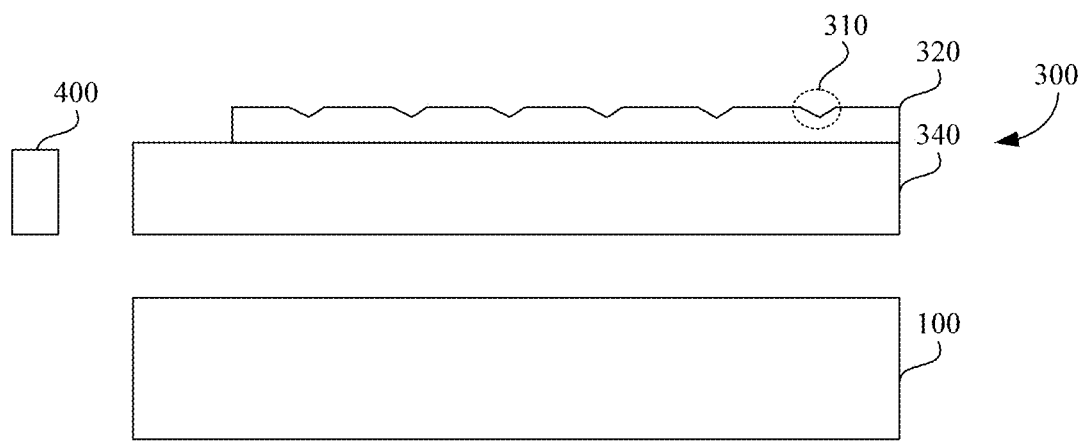
FIG. 1 is a schematic diagram illustrating a structure of a front light source module and a reflective display panel stacked together according to an embodiment of the present disclosure.
Figure 2:
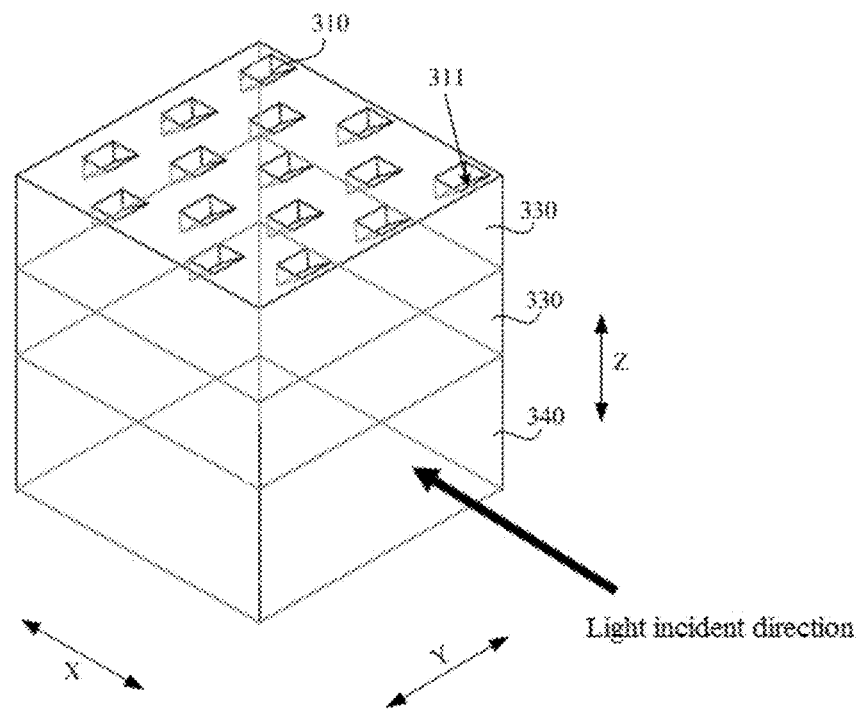
FIG. 2 is a schematic diagram of a structure of a front light source module according to an embodiment of the present disclosure.
Figure 3:
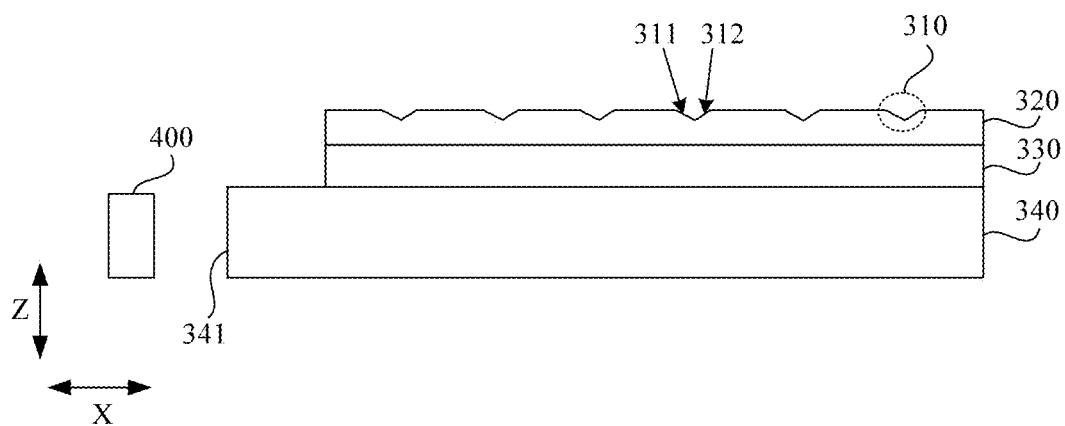
FIG. 3 is a schematic cross-sectional view of a front light source module according to an embodiment of the present disclosure.

FIG. 1 is a schematic diagram illustrating a structure of a front light source module and a reflective display panel stacked together according to an embodiment of the present disclosure; FIG. 2 is a schematic diagram of a structure of a front light source module according to an embodiment of the present disclosure; FIG. 3 is a schematic cross-sectional view of a front light source module according to an embodiment of the present disclosure. As shown in FIG. 1 to FIG. 3, a front light source module may be disposed on a light outgoing side of a reflective display panel 100 to provide light for display (display light) to the reflective display panel 100 in a weak ambient light scene. The front light source module includes: a side light source 400, a light guide layer 340 and a first light adjusting layer 320.

The light guide layer 340 includes a light incident side 341, and the light incident side 341 and the side light source 400 are disposed opposite to each other in a first direction X (e.g., a horizontal direction in FIG. 3). The light from the side light source 400 may be incident into the light guide layer 340 through the light incident side 341. The first light adjusting layer 320 and the light guide layer 340 are stacked in a third direction Z (e.g., a vertical direction in FIG. 3), a side of the first light adjusting layer 320 away from the light guide layer 340 is provided with a plurality of micro-groove structures 310, and each micro-groove structure 310 includes: a first inclined surface 311 and a second inclined surface 312 opposite to each other in the first direction X. The first inclined surface 311 is configured to face the light incident side 341 and is closer to the light incident side 341 than the second inclined surface 312, an angle α between the first inclined surface 311 and a plane where a surface of the first light adjusting layer 320 away from the light guide layer 340 is located is in a range from 26° to 42°, and a depth H of each micro-groove structure 310 is in a range from 4 μm to 15 μm. A refractive index of the first light adjusting layer 320 is greater than or equal to that of the light guide layer 340.

In some embodiments, the first light adjusting layer 320 is attached by a first attaching adhesive layer 330, a refractive index of the first attaching adhesive layer 330 is greater than or equal to that of the light guide layer 340 and is less than or equal to that of the first light adjusting layer 320.

In the embodiment of the present disclosure, the light provided by the side light source 400 may be incident into the light guide layer 340 through the light incident side 341, and part of the light may be incident into the first light adjusting layer 320 during the light propagation process in the light guide layer 340. The micro-groove structures 310 are disposed in the first light adjusting layer 320, each micro-groove structure 310 includes the first inclined surface 311 facing the light incident side 341, and the first inclined surface 311 may reflect the part of the light incident into the first light adjusting layer 320 toward the reflective display panel 100 (i.e., a side of the first light adjusting layer 320 close to the light guide layer 340), so as to provide light for display to the reflective display panel 100.

The refractive index of the first light adjusting layer 320 is greater than or equal to that of the light guide layer 340, so that total reflection of light occurring when the light is incident from the light guide layer 340 to the first light adjusting layer 320 can be effectively avoided, the quantity of light which may be transmitted to the first light adjusting layer 320 is ensured, and the quantity of light which are finally provided to the reflective display panel 100 by the front light source module is favorably improved.

Similarly, with the first attaching adhesive layer 330, the refractive index of the first attaching adhesive layer 330 is greater than or equal to the refractive index of the light guide layer 340 and less than or equal to the refractive index of the first light adjusting layer 320, the total reflection of light occurring when the light is incident from the light guide layer 340 to the first light adjusting layer 320 can be also avoided.

In addition, in the embodiment of the present disclosure, the light source 400 is unnecessarily turned on in an environment with a strong ambient light, and the display may be realized by the ambient light. At this time, the ambient light needs to pass through the front light source module to the reflective display panel 100, and forms the light for imaging (imaging light) by light reflection of the reflective display panel 100, and the imaging light passes through the front light source module and then exits. In the procedure that the external ambient light or the imaging light passes through the front light source module, the micro-groove structures 310 in the first light adjusting layer 320 will certainly affect the external ambient light or the imaging light, which will affect the final display quality. To solve the above problem, a size of each micro-groove structure 310 in the first light adjusting layer 320 is designed to be smaller in the embodiment of the present disclosure. For example, a depth H of each micro-groove structure 310 is in a range from 4 μm to 15 μm. However, since the size of the micro-groove structure 310 is too small and the requirements for the flatness and the inclined angle accuracy of the first inclined surface are high, it is difficult to form the micro-groove structures 310 by a conventional patterning process (it is difficult to form the flat first inclined surface and control a first inclined angle by the patterning process) or an injection molding process (it is difficult to form the micro-groove structures with a small size due to the process accuracy of the injection molding process). Therefore, in the embodiment of the present disclosure, a material of the first light adjusting layer 320 may be a nano-imprint material. At this time, the micro-groove structures 310 with a small size may be formed by a nano-imprint process, and the first inclined surface of each formed micro-groove structure 310 is flat. In some embodiments, the nano-imprint material includes nano-imprint glue, such as acrylic resin. A refractive index of the nano-imprint material may be adjusted by adding inorganic particles (e.g., TiO2, ZrO2, etc.) to the nano-imprint glue.

In addition, in the embodiment of the present disclosure, the angle α between the first inclined surface 311 and the plane where the surface of the first light adjusting layer 320 away from the light guide layer 340 is located is in a range from 26° to 42°, so that an incident angle of the display light reflected by the first inclined surface 311 and emitted to the reflective display panel 100 is within a high-reflectivity incident angle range of the reflective display panel 100 as much as possible when the display light reaches the reflective display panel 100, and an exit angle of the light refracted on the first inclined surface 311 and finally emitted from an opening of each micro-groove structure 310 is outside a viewing angle range of a display apparatus as much as possible.

Figure 4:
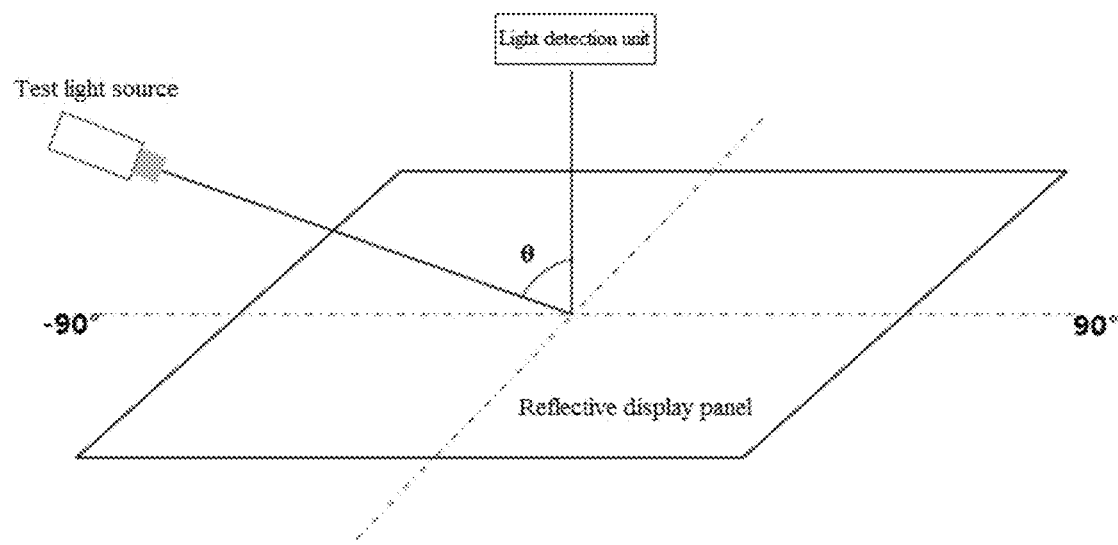
FIG. 4 is a schematic diagram illustrating how to test reflectivity of a reflective display panel under incident light at different angles.
Figure 5:
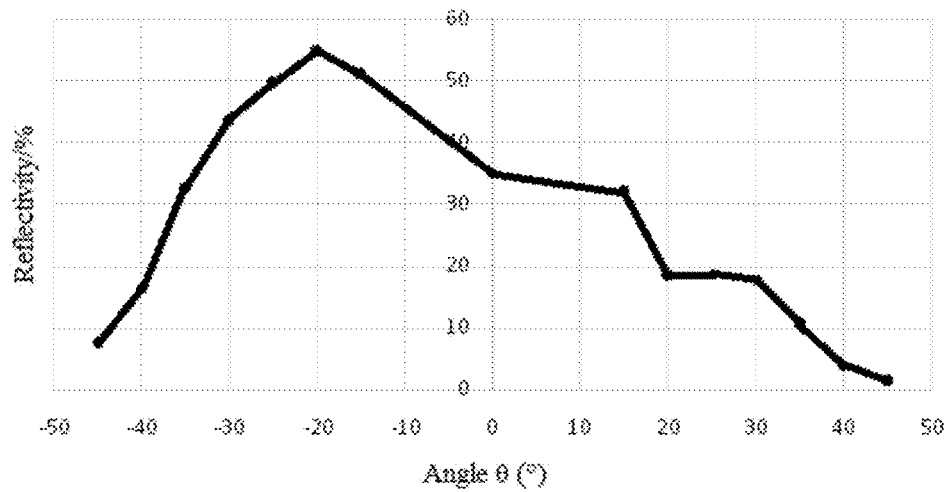
FIG. 5 is a graph illustrating reflectivity of a reflective display panel under incident light at different angles.

FIG. 4 is a schematic diagram illustrating a method for testing reflectivity of a reflective display panel under incident light at different angles; FIG. 5 is a graph illustrating reflectivity of a reflective display panel under incident light at different angles. As shown in FIGS. 4 and 5, a reflective layer in the reflective display panel 100 mainly performs a specular reflection, and a scattering layer or a panel bump structure in the reflective display panel 100 modulates the light reflected by the reflective layer to a main viewing angle. In the test scene shown in FIG. 4, a light detection unit is aligned with (directly faces) the reflective display panel 100, and then a position of a test light source is continuously adjusted to change an angle θ of the light emitted to the reflective display panel 100. The angle θ may vary in a range from −90° to 90°.

It is found through testing that when the light is incident on the reflective display panel 100 at different angles θ, a reflectivity of the reflective display panel 100 is greatly different. The reflective display panel 100 may exhibit a certain reflectivity when the angle θ of the incident light is between −45° and +45°, and the reflective display panel 100 exhibits a higher reflectivity (greater than 40%) when the angle θ of the incident light is between −10° and −30°.

In the present disclosure, an angle α between the first inclined surface 311 and a plane where a surface of the first light adjusting layer 320 away from the light guide layer 340 is located directly affects an incident angle of the display light reflected by the first inclined surface 311 when the display light reaches the reflective display panel 100.

Figure 6:
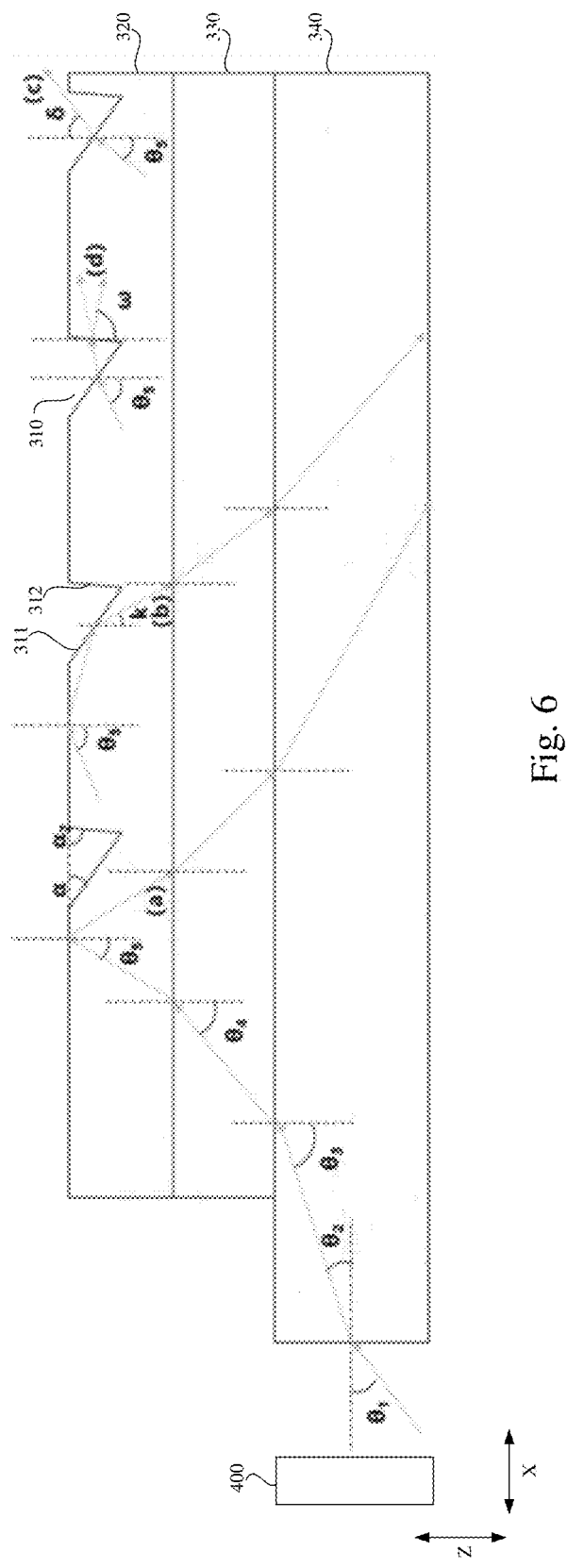
FIG. 6 is a schematic diagram illustrating optical paths at some positions in a front light source module according to an embodiment of the present disclosure.

FIG. 6 is a schematic diagram of optical paths at some positions in a front light source module according to an embodiment of the present disclosure. As shown in FIG. 6, the refractive index of the light guide layer 340 is denoted by n(340), the refractive index of the first attaching adhesive layer 330 is denoted by n(330), the refractive index of the first light adjusting layer 320 is denoted by n(310), refractive indices of a medium in contact with a surface of the first light adjusting layer 320 away from the light guide layer 340 and a medium in contact with the light incident side 341 are denoted by n(air), and n(air)<n(340)<n(330)<n(310). An angle between the second inclined surface 312 and a surface of the first light adjusting layer 320 away from the light guide layer 340 is $\alpha_2$, and a length of the opening of each micro-groove structure 310 in the first direction X is $L_1$.

A critical angle of total reflection of the surface of the first light adjusting layer 320 away from the light guide layer 340 is denoted by $\theta_{c1}$:

$$\theta_{c1} = \arcsin\left(\frac{n(\text{air})}{n(310)}\right)$$

A critical angle of total reflection at an interface between the first light adjusting layer 320 and the first attaching adhesive layer 330 is denoted by $\theta_{c2}$:

$$\theta_{c2} = \arcsin\left(\frac{n(330)}{n(310)}\right)$$

The following four optical paths may exist for the light input from the light incident side 341 to the first light adjusting layer 320:

Optical path (a): the light reaches the surface of the first light adjusting layer 320 away from the light guide layer 340 at an angle $\theta_5$, and then is reflected by the surface, and the reflected light does not pass through the micro-groove structures 310. At this time, $\theta_5 < 90-\alpha$, the reflected light travels downward at the angle $\theta_5$. At this time, the following relationships exist:

$$n(\text{air}) \times \sin\theta_1 = n(340) \times \sin\theta_2 \qquad \text{Formula (1)}$$

-continued $$\theta_3 = 90 - \theta_2$$

$$n(340) \times \sin\theta_3 = n(330) \times \sin\theta_4 = n(310) \times \sin\theta_5$$

$$\theta_5 = \arcsin\left(\frac{n(340)}{n(310)} \times \sqrt{1 - \left(\frac{n(\text{air})}{n(340)}\right)^2 \times (\sin\theta_1)^2}\right)$$

Optical path (b): the light reaches the surface of the first light adjusting layer 320 away from the light guide layer 340 at the angle $\theta_5$, and then is reflected by the surface, and the reflected light reaches a first inclined surface 311 of a micro-groove structure 310 and is reflected by first inclined surface 311. In order to realize the light convergence, an angle k of the reflected light is less than $\theta_5$. At this time, the angle k of the reflected light meets the following relationship:

$$k = 180 - \theta_5 - 2 \times \alpha \qquad \text{Formula (2)}$$

Optical path (c): the light is directly irradiated and is refracted on the first inclined surface 311 of the micro-groove structure 310, and the refracted light is directly emitted from the opening of the micro-groove structure 310, that is, light leakage is generated at the micro-groove structure 310. At this time, an exit angle δ of the refracted light meets the following relationship:

$$\delta = \alpha + \arcsin\left(\frac{n(310)}{n(\text{air})} \times \sin(\theta_5 - \alpha)\right) \qquad \text{Formula (3)}$$

Optical path (d): the light is irradiated and is refracted on the first inclined surface 311 of the micro-groove structure 310, but the refracted light travels to the second inclined surface 312 and is refracted on the second inclined surface 312 and enters the first light adjusting layer 320 again. At this time, a refraction angle ω of the refracted light meets the following relationship:

$$\alpha_2 = \arctan\left(\frac{H}{L_1 - H \times \cot\alpha}\right) \qquad \text{Formula (4)}$$

$$\omega = \alpha_2 + \arcsin\left(\frac{n(\text{air})}{n(310)} \times \sin(180 - \delta - \alpha_2)\right)$$

$$\omega = \arctan\left(\frac{H}{L_1 - H \times \cot\alpha}\right) +$$

$$\arcsin\left(\frac{n(\text{air})}{n(310)} \times \sin\left(180 - \delta - \left(\arctan\left(\frac{H}{L_1 - H \times \cot\alpha}\right)\right)\right)\right)$$

Since the refraction angle ω is large, most of the light may be constrained to be totally reflected by the first light adjusting layer 320. In order to destroy the total reflection and cause the light to continuously propagate downward, it is necessary to increase the critical angle $\theta_{c2}$ of total reflection at the interface between the first light adjusting layer 320 and the first attaching adhesive layer 330. Preferably, the refractive index n(330) of the first attaching adhesive layer 330 is equal to the refractive index n(310) of the first light adjusting layer 320, and at this time, the light with any refraction angle ω may pass through the interface between the first light adjusting layer 320 and the first adhesive layer.

To facilitate a better understanding of the technical solution of the present disclosure for one of ordinary skill in the art, a detailed description will be given below with reference to a specific example.

Where n(air) is 1, n(340) is 1.49, n(330) is 1.55, n(310) is 1.58, α is 37°, $L_1$ is 11.2 μm, and H is 6 μm. The following table 1 may be obtained by calculation using the above formulas (1) to (4).

TABLE 1

Angle calculation result table for different optical paths

| Intensity of incident light at different angles at light incident side 341 | $\theta_1$ | $\theta_5$ | $\theta_{c1}$ | Optical path (a) $\theta_5$ | Optical path (b) k | Optical path (c) δ | Optical path (d) ω | $\theta_{c2}$ |
|---|---|---|---|---|---|---|---|---|
| 0 | 90° | 44.4° | 39.3° | 44.4° | — | 48.8° | 98° | 78.8° |
| 0.3 × $I_0$ | 70° | 47° | 39.3° | 47° | — | 53° | 96.8° | 78.8° |
| 0.5 × $I_0$ | 60° | 50° | 39.3° | 50° | — | 58° | 95° | 78.8° |
| 0.6 × $I_0$ | 52.4° | 53° | 39.3° | 53° | 53° | 62.8° | 93° | 78.8° |
| 0.7 × $I_0$ | 43° | 57° | 39.3° | — | 49° | 70° | 90° | 78.8° |
| 0.95 × $I_0$ | 19° | 67° | 39.3° | — | 39° | 89° | 79.6° | 78.8° |
| 0.98 × $I_0$ | 12° | 69° | 39.3° | — | 37° | — | 76.9° | 78.8° |
| $I_0$ | 0° | 70.6° | 39.3° | — | 35.4° | — | 74.4° | 78.8° |

In the above table 1, the intensity of the light incident on the light incident side 341 at the incident angle $\theta_1=0°$ is $I_0$, the intensity of the light incident on the light incident side 341 at the incident angle $\theta_1=12°$ is $0.98 \times I_0$, the intensity of the light incident on the light incident side 341 at the incident angle $\theta_1=19°$ is $0.95 \times I_0$, the intensity of the light incident on the light incident side 341 at the incident angle $\theta_1=43°$ is $0.7 \times I_0$, and so on.

As can be seen from the results in Table 1, the angle ω of the refracted light for the optical path (d) is large (ω≥74.4°). Even if such the refracted light with the large angle may be transmitted to the reflective display panel, it can be seen from a reflectivity curve in FIG. 5 that the reflectivity of the reflective display panel for the light with the large angle is extremely low. Therefore, the utilization value for the light in the optical path (d) is low.

The angles of the reflected light formed in the optical paths (a) and (b) are less than or equal to 53°, and thus the light is the light with the small angle. It can be seen from the reflectivity curve in FIG. 5 that the reflectivity of the reflective display panel for the light with the small angle is relatively high. Therefore, the utilization value for the light in the optical paths (a) and (b) is relatively high. Further, the reflected light formed in the optical path (a) mainly comes from the light with the incident angle $\theta_1$ in a range from 52.4° to 90° at the light incident side 341, the reflected light formed in the optical path (b) mainly comes from the light with the incident angle $\theta_1$ in a range from 0° to 52.4° at the light incident side 341, and the intensity of the light with the incident angle $\theta_1$ in a range from 0° to 52.4° is significantly greater than the intensity of the light with the incident angle $\theta_1$ in a range from 52.4° to 90°, that is, the intensity of the reflected light for display formed in the optical path (b) is greater than that in the optical path (a). That is, the utilization value for the light in the optical path (b) is higher than that in the optical path (a).

Based on the above calculation results, it can be concluded that when the light output by the side light source 400 is converged so that the incident light angle $\theta_1$ of all the light incident to the light incident side 341 is in a range from 0° to 52.4°, the quantity of light forming the optical path (b) can be effectively increased, so as to increase the quantity of light provided by the front light source module to the reflective display panel 100, which is beneficial to increasing the display brightness.

Due to the existence of the optical path (c), which indicates that there is light leakage at the micro-groove structure 310, the light leakage at the micro-groove structure 310 directly affects the contrast of the display apparatus. For this reason, an exit angle δ of the light leaked from the micro-groove structure 310 should be larger than a maximum viewing angle δ max of the display apparatus as much as possible, so as to prevent the user from receiving the light leakage at the micro-groove structure 310 under the viewing angle. Generally, the maximum viewing angle δ max of the display apparatus is 60°.

From the formulas (1) and (3), it may be obtained that $\theta_1$ satisfies the following relationship:

Formula 5

$$\theta_1 = \arcsin \sqrt{\left(\frac{n(340)}{n(\text{air})}\right)^2 \times \left[1 - \left(\frac{n(310)}{n(340)} \times \sin\left(\alpha + \arcsin\left(\frac{n(\text{air})}{n(310)} \times \sin(\delta - \alpha)\right)\right)\right)^2\right]}$$

When δ>δ max=60°, the following relationship may be obtained:

$$\theta_1 < \arcsin \sqrt{\left(\frac{n(340)}{n(\text{air})}\right)^2 \times \left[1 - \left(\frac{n(310)}{n(340)} \times \sin\left(\alpha + \arcsin\left(\frac{n(\text{air})}{n(310)} \times \sin(60° - \alpha)\right)\right)\right)^2\right]}$$

By substituting n(air)=1, n(340)=1.49, n(310)=1.58, α=37° into Formula (5), $\theta_1 < 56.7°$ may be obtained through calculation.

It should be noted that when δ max is larger, the exit angle δ of the leaked light will be further limited. For example, when the maximum viewing angle δ max is 70°, $\theta_1 < 43°$ may be obtained by calculation. Therefore, in order to further reduce the effect of the light leakage at the opening of the micro-groove structure 310 with the light leakage, the light with the incident light angle $\theta_1$ at the light incident side 341 may be further converged.

Figure 7:
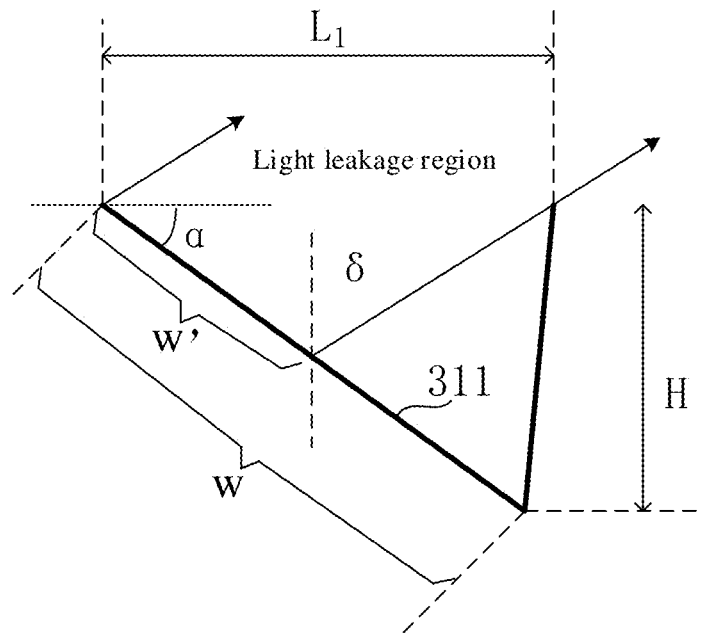
FIG. 7 is a schematic diagram illustrating light leakage at an opening of a micro-groove structure according to an embodiment of the present disclosure.

FIG. 7 is a schematic diagram illustrating light leakage at an opening of a micro-groove structure according to an embodiment of the present disclosure. As shown in FIG. 7, the refracted light generated after being irradiated to a region indicated by w' forms light leakage, and the refracted light generated after being irradiated to a region indicated by w-w' enters the first light adjusting layer 320 again through the second inclined surface 312 (no light leakage is formed).

A light leakage probability at the opening of the micro-groove structure 310 is defined as P, and P satisfies:

$$P = \frac{w'}{w} = \frac{L1}{H \times (\cot\alpha + \tan\delta)} = \frac{L1}{H} \times \frac{1}{(\cot\alpha + \tan\delta)} \quad \text{Formula (6)}$$

As can be seen from Formula (6), the light leakage probability P is related to L1, H, α, and δ.

Figure 8:
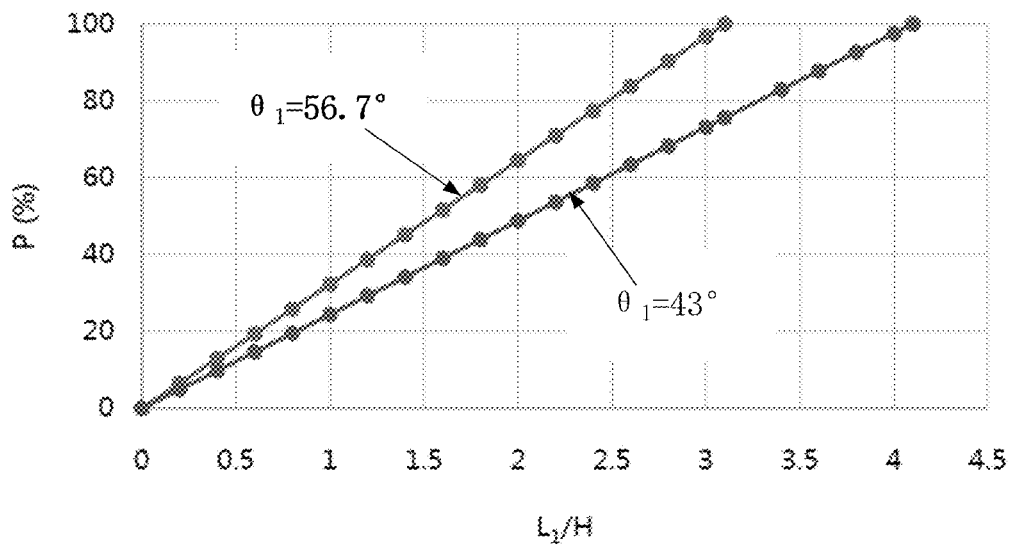
FIG. 8 is a schematic diagram illustrating a light leakage probability P at an opening of a micro-groove structure varying with $L_1/H$ when $\theta_1$ is respectively 56.7° and 43° with $\alpha=37°$ according to an embodiment of the present disclosure.

FIG. 8 is a schematic diagram illustrating a light leakage probability P at an opening of a micro-groove structure 310 varying with $L_1/H$ when $\theta_1$ is respectively 56.7° and 43°, with α=37° according to an embodiment of the present disclosure. As shown in FIG. 8, α is 37°. When $\theta_1$ is 56.7°, the light leakage probability is linearly increased along with the increase of $L_1/H$; when $\theta_1$ is 43°, the light leakage probability is linearly increased along with the increase of $L_1/H$.

Figure 9:
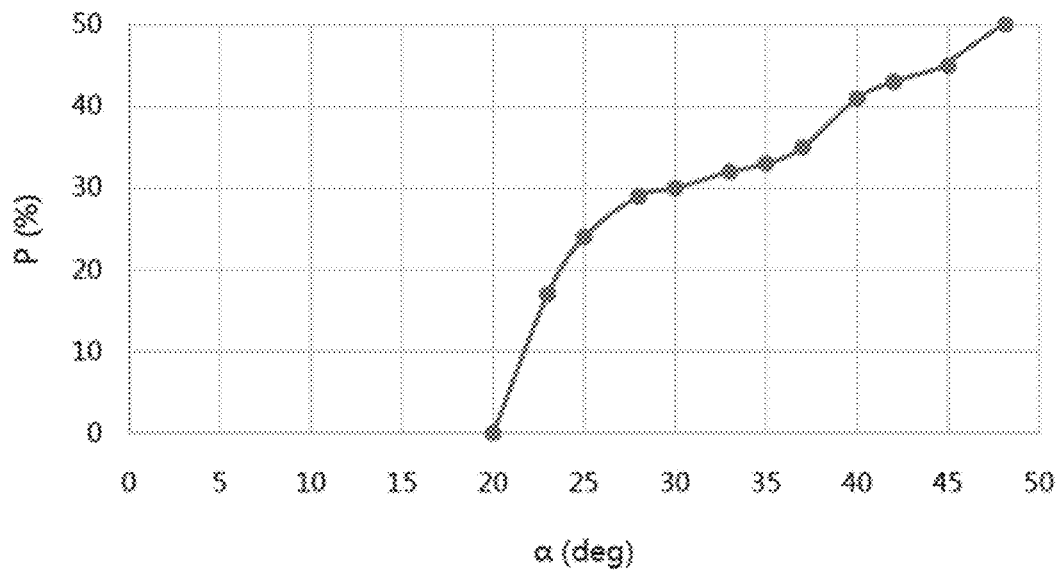
FIG. 9 is a schematic diagram illustrating a light leakage probability P at an opening of a micro-groove structure varying with $\alpha$ when $L_1/H$ is 11.2/6 according to an embodiment of the present disclosure.

FIG. 9 is a schematic diagram illustrating a light leakage probability P at an opening of a micro-groove structure 310 varying with α when $L_1/H$ is 11.2/6 according to an embodiment of the present disclosure. As shown in FIG. 9, $L_1/H$ is 11.2/6. With α in a range from 20° to 45°, the light leakage probability increases along with the increase of α.

Figure 10:
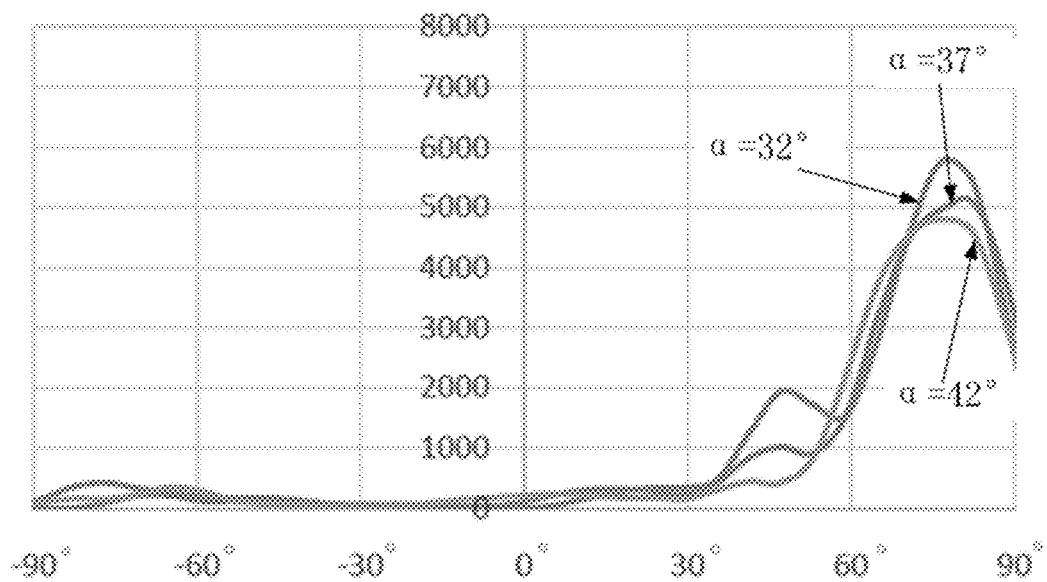
FIG. 10 is a schematic diagram illustrating distribution of the brightness of light emitted from a side of a first light adjusting layer away from a light guide layer at different angles of $\alpha$ which are simulated according to an embodiment of the present disclosure.
Figure 11:
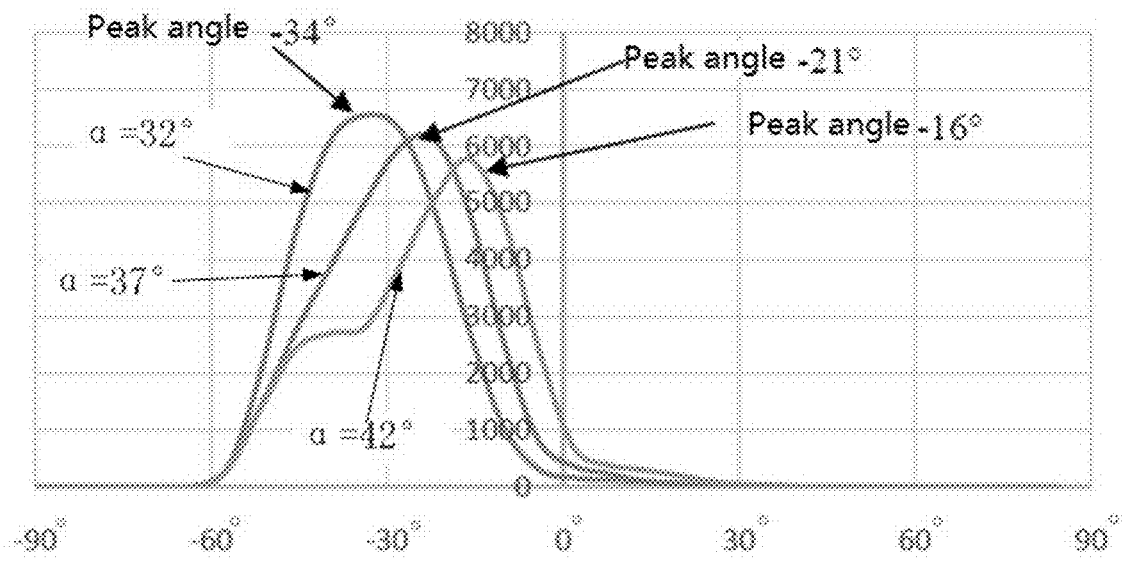
FIG. 11 is a schematic diagram illustrating distribution of the brightness of light emitted from a side of a first light adjusting layer close to a light guide layer at different angles of $\alpha$ which are simulated according to an embodiment of the present disclosure.

FIG. 10 is a schematic diagram illustrating brightness distribution of light from a side of a first light adjusting layer away from a light guide layer simulated at different angles α according to an embodiment of the present disclosure. FIG. 11 is a schematic diagram illustrating brightness distribution of light from a side of a first light adjusting layer 320 close to a light guide layer 340 simulated at different angles of α according to an embodiment of the present disclosure. As shown in FIGS. 10 and 11, it is defined that the light forms a negative (−) angle with the third direction Z when propagating in a direction away from the light incident side 341, and the light forms a positive (+) angle with the third direction Z when propagating in a direction close to the light incident side 341 (in the same manner as the angle θ in FIGS. 4 and 5).

As can be seen from the result of FIG. 10, when α is 32°, 37° or 42°, an angle corresponding to a peak brightness of the light outgoing of a side of the first light adjusting layer 320 away from the light guide layer 340 is greater than 75°, and the exit angle of most of the light is greater than 60°. That is, the exit angle of most of the light leaking from the opening of the micro-groove structure 310 is outside the viewing angle range of the display apparatus (the maximum viewing angle δ max is typically 60°). Therefore, when α is set in a range from 32° to 42°, the exit angle of the light refracted on the first inclined surface 311 and finally emitted from the opening of each micro-groove structure 310 is outside the viewing angle range of the display apparatus as much as possible, which is beneficial to improving the contrast of the display apparatus.

As can be seen from the results of FIG. 11, when α is 32°, an angle corresponding to a peak brightness of the light outgoing of a side of the first light adjusting layer 320 close to the light guide layer 340 is −34°. When α is 37°, an angle corresponding to a peak brightness of the light outgoing of a side of the first light adjusting layer 320 close to the light guide layer 340 is −21°. When α is 42°, an angle corresponding to a peak brightness of the light outgoing of a side of the first light adjusting layer 320 close to the light guide layer 340 is −16°. Under three different α values, the angles corresponding to a peak brightness of the light outgoing are better matched with the high-reflectivity incident angle range (from −10° to −30°) of the reflective display panel 100 shown in FIG. 5.

Therefore, in the embodiment of the present disclosure, the angle α between the first inclined surface 311 and the plane where the surface of the first light adjusting layer 320 away from the light guide layer 340 is located is in a range from 32° to 42°, so that the incident angle of the display light reflected by the first inclined surface 311 and emitted to the reflective display panel 100 is within the high-reflectivity incident angle range of the reflective display panel 100 as much as possible (to improve the display brightness) when the display light reaches the reflective display panel 100, and the exit angle of the light refracted on the first inclined surface 311 and finally emitted from an opening of each micro-groove structure 310 is outside the viewing angle range of the display apparatus as much as possible (to improve display contrast).

It should be noted that when the angle α between the first inclined surface 311 and the plane where the surface of the first light adjusting layer 320 away from the light guide layer 340 is located is smaller than 32° and greater than or equal to 26°, the simulated angle corresponding to a peak brightness of the light outgoing of a side of the first light adjusting layer 320 away from the light guide layer 340 is still greater than 60°, and the angle corresponding to a peak brightness of the light outgoing of a side of the first light adjusting layer 320 close to the light guide layer 340 is about −40°, that is, the exit angle of most of the light emitted from the opening of the micro-groove structure 310 is outside the viewing angle range of the display apparatus, and the display light reflected by the first inclined surface 311 and emitted to the reflective display panel 100 is better matched with the high-reflectivity incident angle range of the reflective display panel 100.

When the angle α between the first inclined surface 311 and the plane where the surface of the first light adjusting layer 320 away from the light guide layer 340 is located is greater than 42°, as can be seen from FIG. 9, the light leakage probability is rapidly increased to a higher level of 50%, which is not favorable for improving the display contrast.

Based on the above comprehensive consideration, in the embodiment of the present disclosure, the angle α between the first inclined surface 311 and the plane where the surface of the first light adjusting layer 320 away from the light guide layer 340 is located is in a range from 26° to 42°.

In addition, in the embodiment of the present disclosure, as shown in FIG. 8, the larger $L_1/H$ is, the larger the light leakage probability is. In the embodiment of the present disclosure, in order to effectively control the light leakage probability of the micro-groove structure 310, $L_1/H$ satisfies: $L_1/H \leq 4$. In practical applications, $L_1$ may be designed to be as small as possible under the conditions of the process operation. Optionally, $L_1$ satisfies $L_1 \leq 80$ μm.

Figure 12:
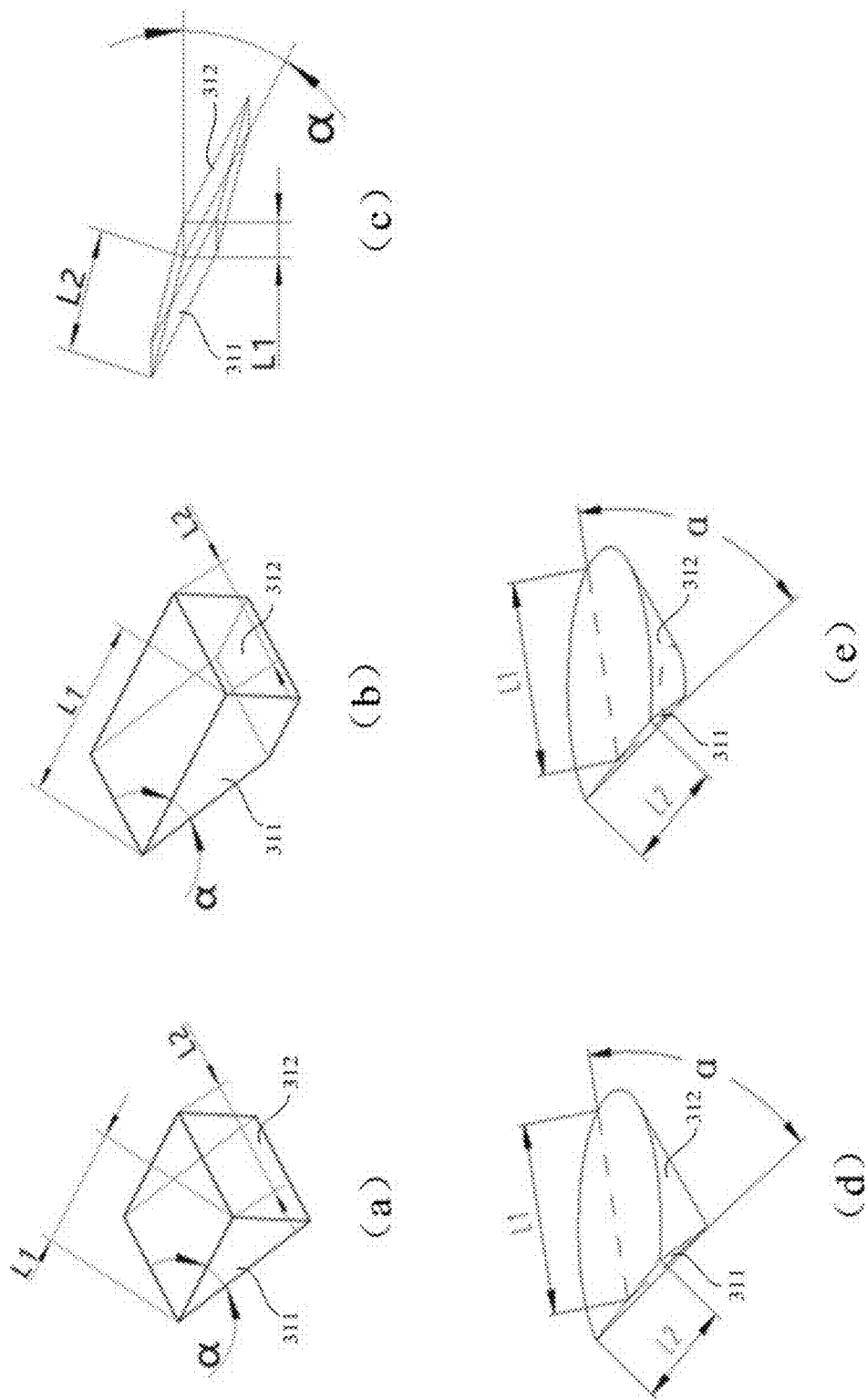
FIG. 12 is a schematic diagram of various configurations for a micro-groove structure according to an embodiment of the present disclosure.

FIG. 12 is a schematic diagram of various configurations of a micro-groove structure according to an embodiment of the present disclosure. As shown in FIG. 12, in some embodiments, each first inclined surface 311 is rectangular, and a pair of opposite sides of the rectangular first inclined surface 311 extend along the second direction Y perpendicular to both the first direction X and the third direction Z. An extending direction of the other pair of opposite sides of the rectangular first inclined surface 311 is perpendicular to the third direction Z, and intersects with both the first direction X and the second direction Y. Optionally, the first direction X, the second direction Y, and the third direction Z are perpendicular to each other.

In some embodiments, a length $L_2$ of each side of the rectangular first inclined surface 311 extending in the second direction Y satisfies: $L_2 \leq 80$ μm.

In some embodiments, a shape of a cross section of each micro-groove structure 310 taken along a plane parallel to the first direction X and parallel to the third direction Z includes: a triangle or a quadrangle. For example, the shape of the cross section of the micro-groove structure 310 taken along a plane parallel to the first direction X and parallel to the third direction Z as shown in parts (a) and (d) in FIG. 12 is a triangle, the shape of the cross section of the micro-groove structure 310 taken along a plane parallel to the first direction X and parallel to the third direction Z as shown in parts (b) and (e) in FIG. 12 is a trapezoid, and the shape of the cross section of the micro-groove structure 310 taken along a plane parallel to the first direction X and parallel to the third direction Z as shown in a part (c) in FIG. 12 is a parallelogram.

In some embodiments, each second inclined surface 312 is a flat surface or a curved surface. For example, the second inclined surface 312 is a flat surface as shown in parts (a), (b), and (c) in FIG. 12, and the second inclined surface 312 is a curved surface as shown in parts (d) and (e) in FIG. 12.

It should be noted that in the embodiment of the present disclosure, the micro-groove structure 310 may also adopt other shapes as long as the angle α between the first inclined surface 311 and the plane where the surface of the first light adjusting layer 320 away from the light guide layer 340 is located is in a range from 26° to 42°, and a depth H of the micro-groove structure 310 is in a range from 4 μm to 15 μm.

Figure 13:
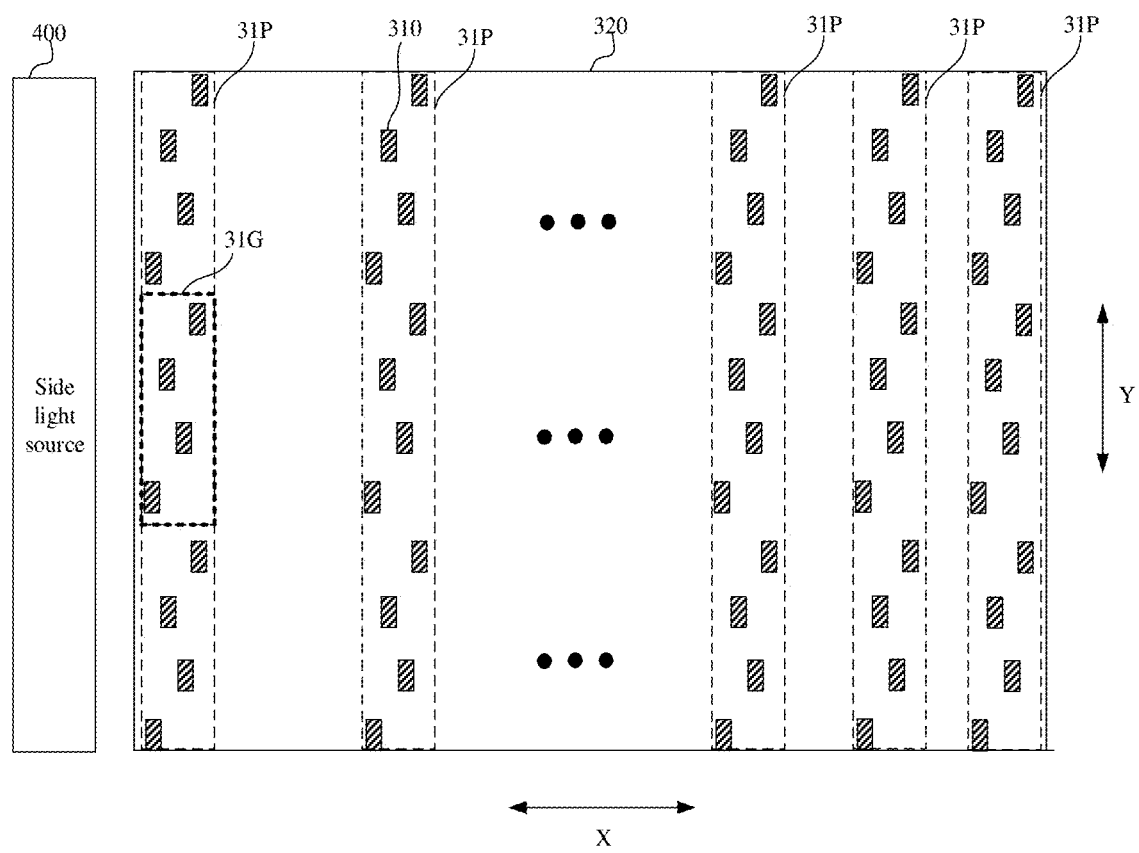
FIG. 13 is a schematic diagram of a layout of micro-groove structures according to an embodiment of the present disclosure.

FIG. 13 is a schematic diagram illustrating a layout of micro-groove structures 310 according to an embodiment of the present disclosure. As shown in FIG. 13, in a direction away from the light incident side 341 along the first direction X starting from the light incident side 341, a distribution density of the micro-groove structures 310 is gradually increased, which is favorable for improving uniformity of light from the front light source module to the reflective display panel 100, and thus is favorable for improving brightness uniformity of an image displayed by the display apparatus.

In some embodiments, the surface of the first light adjusting layer 320 away from the light guide layer 340 is divided into a plurality of groove structure arrangement regions 31P arranged along the first direction X. A distance between every two adjacent groove structure arrangement regions 31P gradually decreases in the direction away from the light incident side 341 along the first direction X starting from the light incident side 341. Each groove structure arrangement region 31P is divided into a plurality of rectangular periodic regions 31G arranged in the second direction Y. A length of each rectangular periodic region 31G in the first direction X is R, and a length of each rectangular periodic region 31G in the second direction Y is Q. M micro-groove structures 310 are uniformly arranged in each rectangular periodic region 31G.

Further alternatively, the M micro-groove structures 310 in each rectangular periodic region 31G are arranged to satisfy: a distance between centers of any two micro-groove structures 310 in the first direction X is greater than or equal to R/M, and a distance between the centers of any two micro-groove structures 310 in the second direction Y is greater than or equal to Q/M. With this arrangement, a distance in the first direction X between the centers of any two micro-groove structures 310 closest to each other in the first direction X in each rectangular periodic region 31G is equal to R/M, and a distance in the second direction Y between the centers of any two micro-groove structures 310 closest to each other in the second direction Y in each rectangular periodic region 31G is equal to Q/M, so that the whole groove structure arrangement region 31P has better brightness uniformity.

In some embodiments, Q/M is less than or equal to 150 μm, i.e., it is ensured that the distance in the second direction Y between the centers of any two micro-groove structures 310 closest to each other in the second direction Y is not greater than 150 μm. With this arrangement, it can be ensured that the picture is fine and smooth, and has no granular sensation (if the distance between the adjacent micro-groove structures 310 in the second direction is too great, human eyes may recognize the granular sensation generated by the micro-groove structures).

Figure 14:
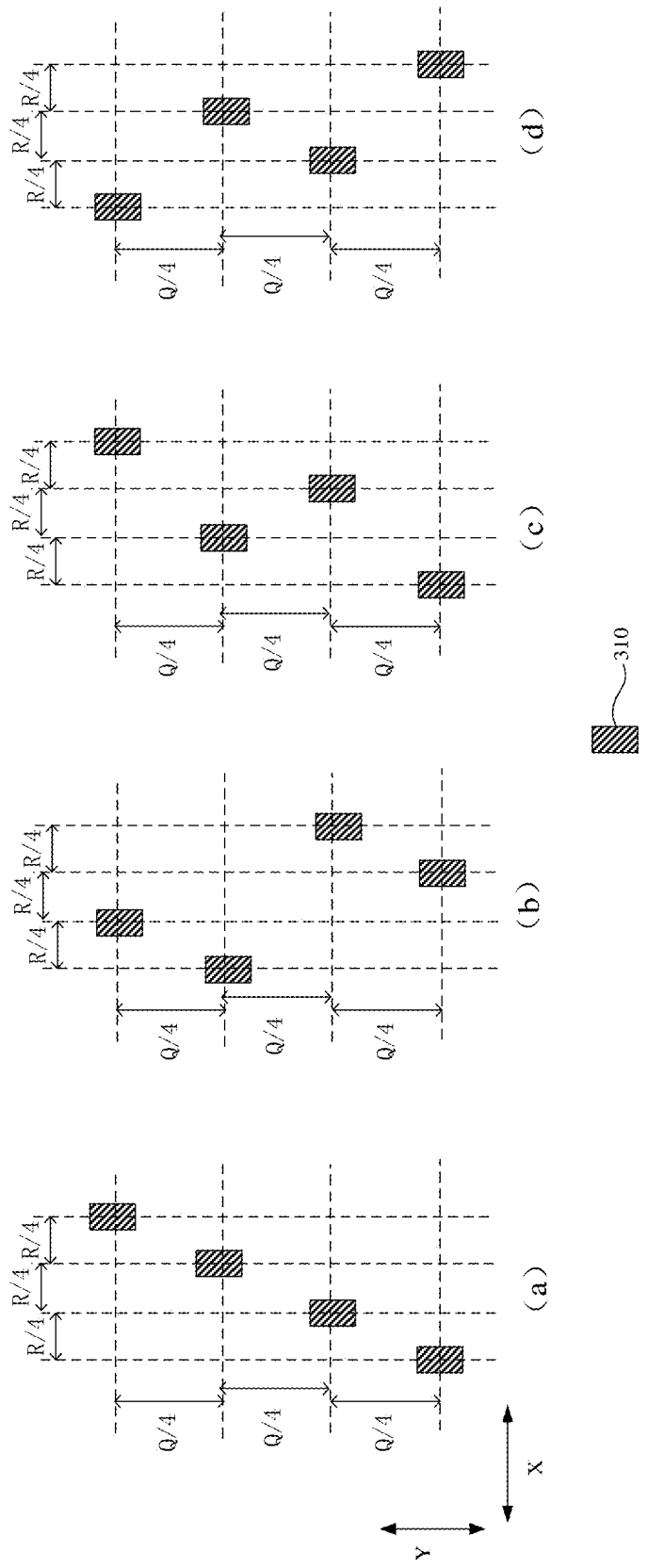
FIG. 14 is a schematic diagram illustrating various layouts for four micro-groove structures within a rectangular periodic region according to an embodiment of the present disclosure.

FIG. 14 is a schematic diagram illustrating various layouts of four micro-groove structures within a rectangular periodic region according to an embodiment of the present disclosure. As shown in FIG. 14, by taking M with a value of four as an example, the distance in the first direction X between the centers of any two micro-groove structures 310 closest to each other in the first direction X in each rectangular periodic region is equal to R/4, and the distance in the second direction Y between the centers of any two micro-groove structures 310 closest to each other in the second direction Y in each rectangular periodic region is equal to Q/4. In this case, a connection line sequentially connecting the centers of the four micro-groove structures 310 may be a straight line or a broken line. For example, the connection line sequentially connecting the centers of the four micro-groove structures 310 is a straight line as shown in a part (a) of FIG. 14, and the connection line sequentially connecting the centers of the four micro-groove structures 310 is a broken line as shown in parts (b), (c), and (d) of FIG. 14.

Figure 15A:
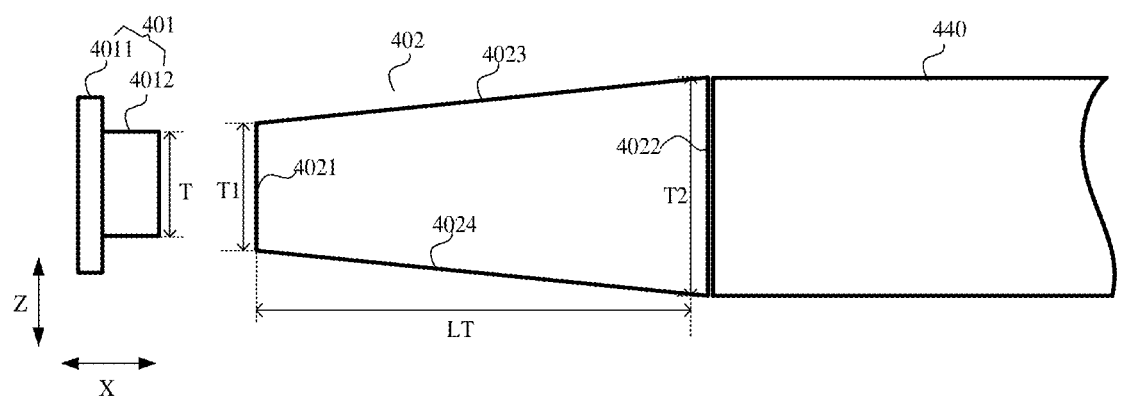
FIG. 15A is a schematic cross-sectional view of a side light source according to an embodiment of the present disclosure.
Figure 15B:
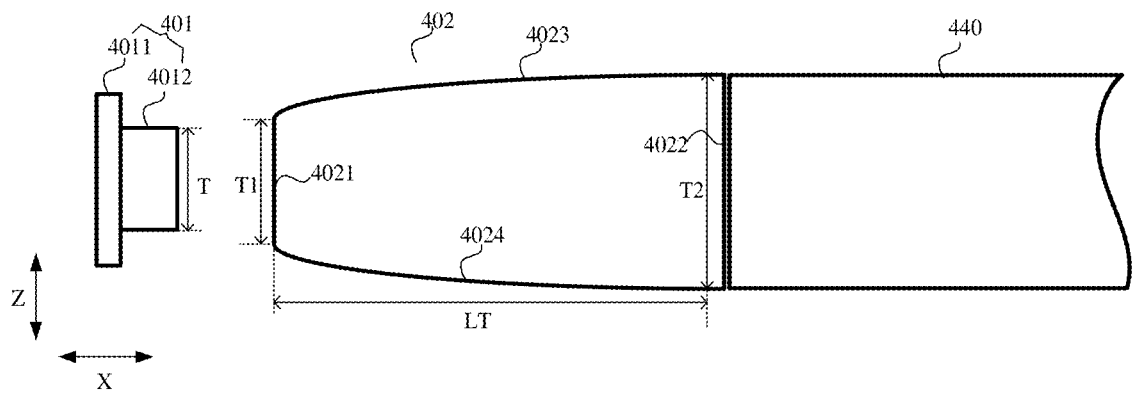
FIG. 15B is another schematic cross-sectional view of a side light source according to an embodiment of the present disclosure.

FIG. 15A is a schematic cross-sectional view of a side light source according to an embodiment of the present disclosure; FIG. 15B is another schematic cross-sectional view of a side light source according to an embodiment of the present disclosure. As shown in FIGS. 15A and 15B, in some embodiments, the side light source 400 includes: a light source 401 and a converging structure, the converging structure is located between the light source 401 and the light incident side 341 and configured to converge the light emitted from the light source in the third direction Z, and an angle $\theta_1$ between the light emitted from the converging structure and a first reference plane satisfies: $\theta_1 \leq 52.4°$, and the first reference plane is a plane perpendicular to the third direction Z.

As can be seen from the table 1, the light emitted from the light source is converged by the converging structure, so that the quantity of light forming the optical path (b) can be effectively increased, the quantity of light provided by the front light source module to the reflective display panel 100 is increased, and the display brightness is favorably improved.

Continuing to refer to FIGS. 15A and 15B, in some embodiments, the converging structure includes: a wedge-shaped light guiding structure 402, which includes: a first light incident surface 4021, a first light outgoing surface 4022, a first light adjusting surface 4023 and a second light adjusting surface 4024, the first light incident surface 4021 and the first light outgoing surface 4022 are oppositely arranged in the first direction X, the first light incident surface 4021 and the first light outgoing surface 4022 are perpendicular to the first direction X, a length of the first light incident surface 4021 in the third direction Z is T1, a length of the first light outgoing surface in the third direction Z is T2, T2>T1, and an orthographic projection of the first light outgoing surface 4022 on a plane where the first light incident surface 4021 is located covers the first light incident surface 4021, the first light adjusting surface 4023 and the second light adjusting surface 4024 are oppositely arranged in the third direction Z, and a distance between the first light adjusting surface 4023 and the second light adjusting surface 4024 in the third direction Z is gradually increased in a direction from the first light incident surface 4021 to the first light outgoing surface 4022 along the first direction X, the light source is opposite to the first light incident surface 4021, and the light incident side 341 is opposite to the first light outgoing surface 4022.

In some embodiments, the light source 401 includes: a driving board 4011 and a light emitting element 4012 fixed on the driving board 4011, wherein a length T of the light emitting element 4012 in the third direction Z is smaller than the length T1 of the first light incident surface in the third direction Z, an orthographic projection of the light emitting element 4012 on the plane where the first light incident surface is located in a region defined by the first light incident surface.

In some embodiments, the light emitting element 4012 may be an LED chip.

In some embodiments, the length T of the light emitting element 4012 in the third direction Z satisfies: T≤0.3 mm.

As a specific example, T is 0.2 mm, T1 is 0.25 mm, T2 is 0.4 mm, and a distance LT between the first light incident surface and the first light outgoing surface in the first direction X is 1.2 mm.

In some embodiments, referring to FIG. 15A, the first light adjusting surface and the second light adjusting surface are both flat surfaces. In other embodiments, referring to FIG. 15B, the first light adjusting surface and the second light adjusting surface are both curved surfaces.

In some embodiments, the wedge-shaped light guiding structure 402 and the light guide layer 340 are made of the same material and have a one-piece structure, and the light incident side 341 and the first light outgoing surface are the same surface.

Figure 16A:
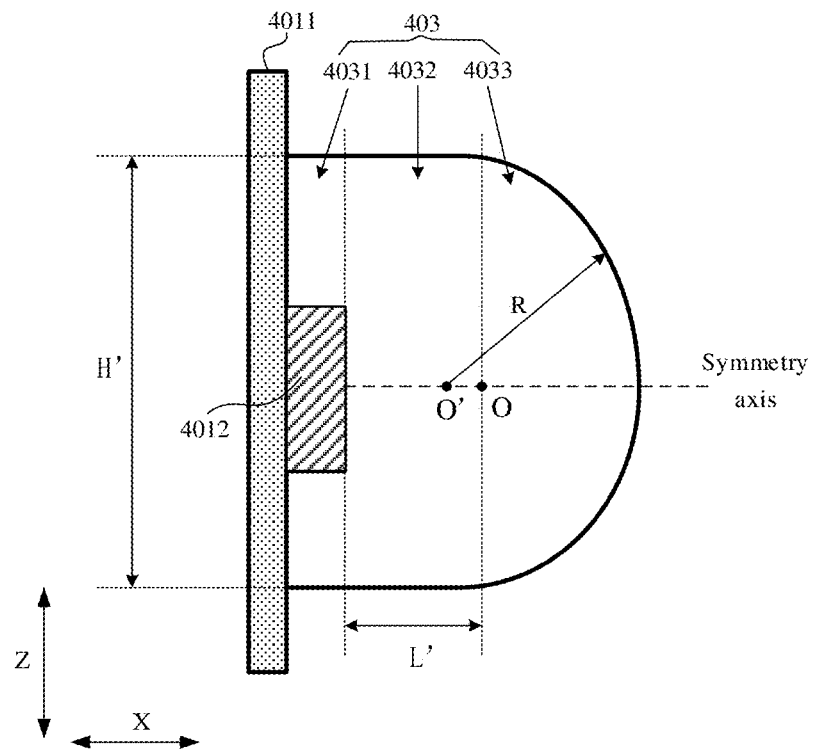
FIG. 16A is another schematic cross-sectional view of a side light source according to an embodiment of the present disclosure.
Figure 16B:
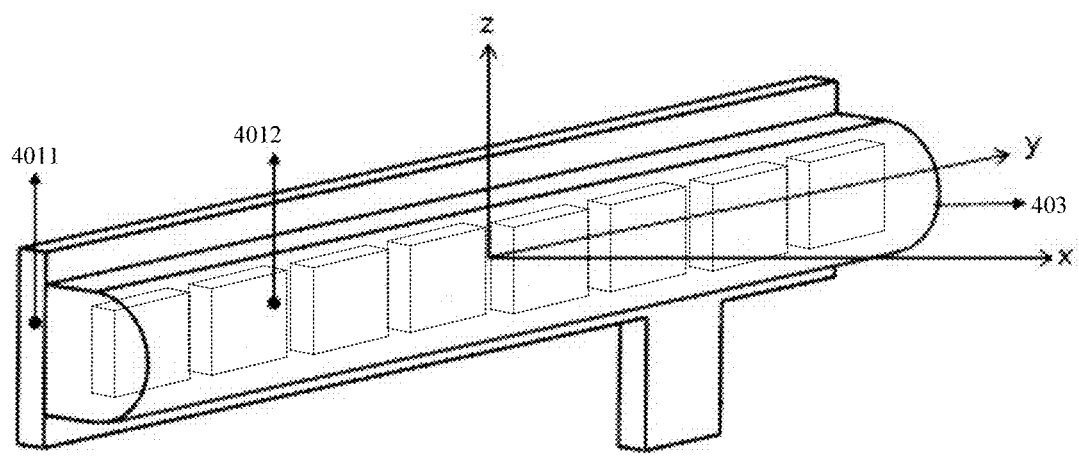
FIG. 16B is a schematic diagram of a structure of the side light source shown in FIG. 16A.
Figure 16C:
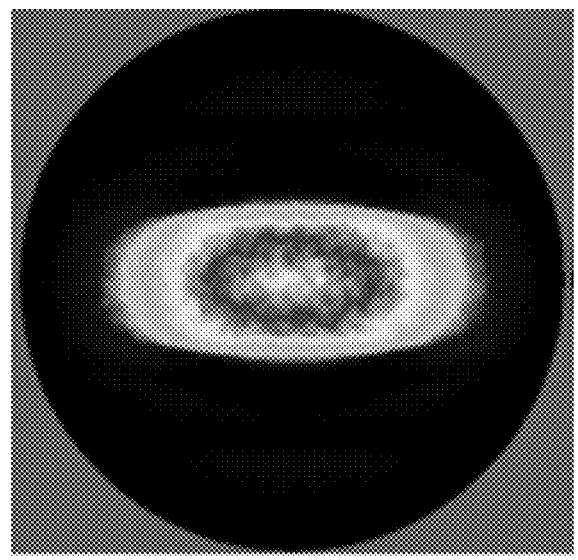
FIG. 16C is a schematic diagram of a light emission effect of the side light source shown in FIG. 16A.
Figure 17A:
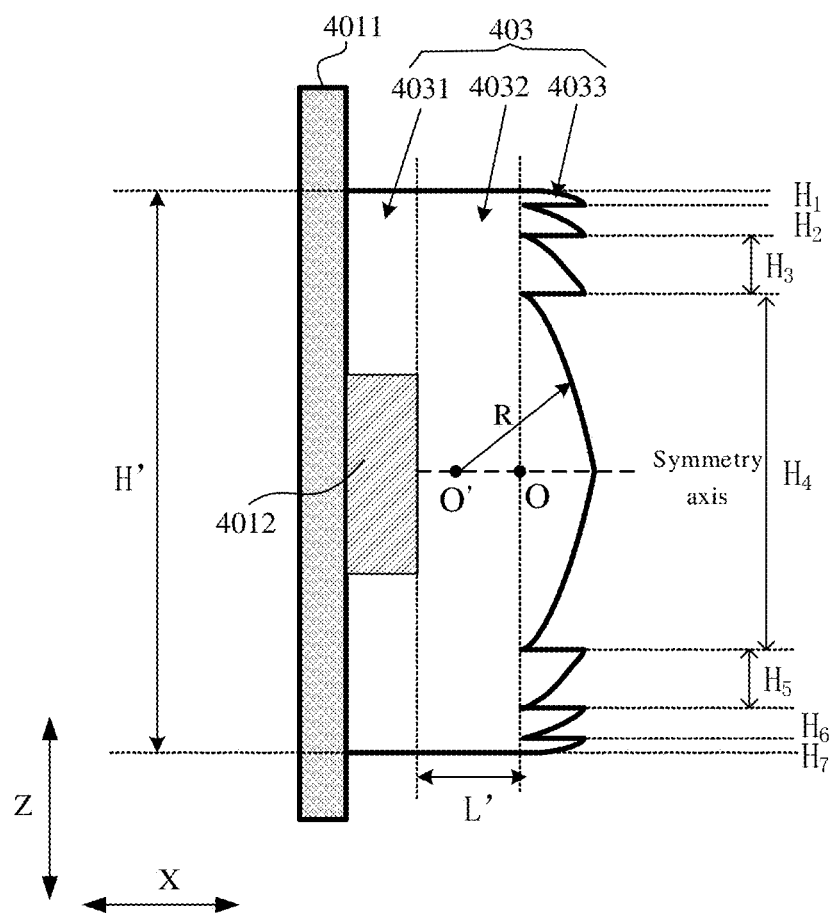
FIG. 17A is a yet another schematic cross-sectional view of a side light source according to an embodiment of the present disclosure.
Figure 17B:
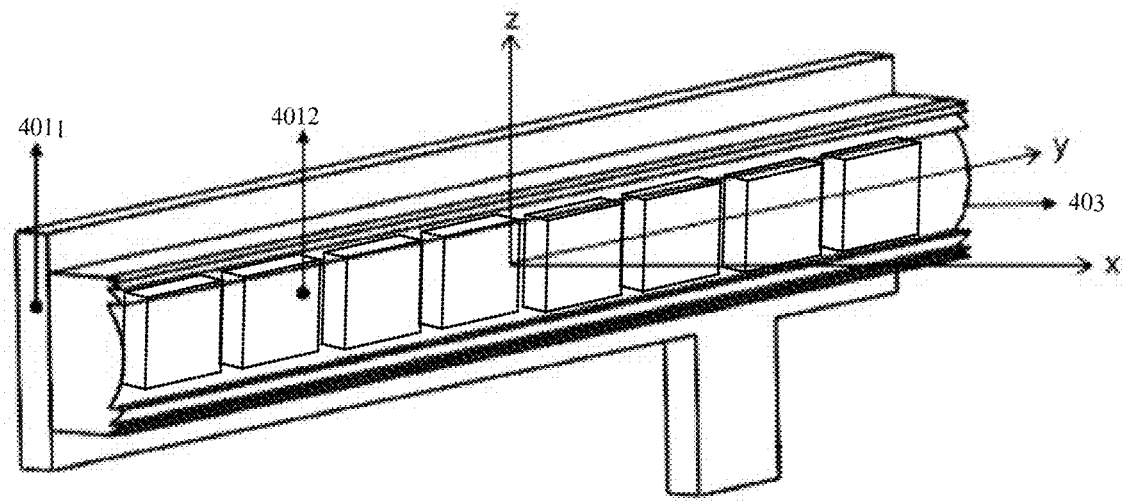
FIG. 17B is a schematic diagram of a structure of the side light source shown in FIG. 17A.
Figure 17C:
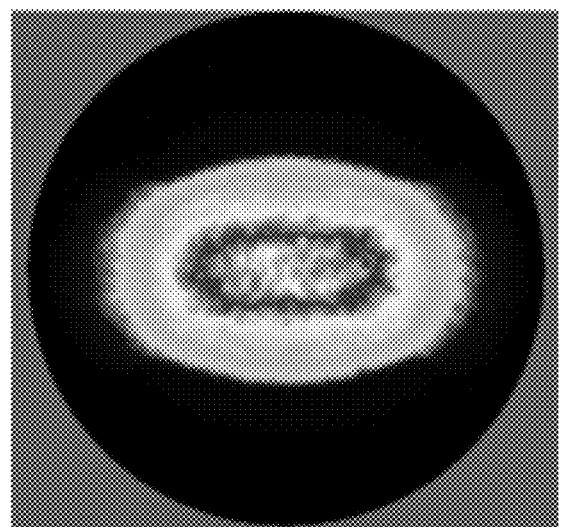
FIG. 17C is a schematic diagram of a light emission effect of the side light source shown in FIG. 17A.

FIG. 16A is another schematic cross-sectional view of a side light source 400 according to an embodiment of the present disclosure; FIG. 16B is a schematic diagram of a structure of the side light source 400 shown in FIG. 16A; FIG. 16C is a schematic diagram of a light emission effect of the side light source 400 shown in FIG. 16A; FIG. 17A is a yet another schematic cross-sectional view of a side light source 400 according to an embodiment of the present disclosure; FIG. 17B is a schematic diagram of a structure of the side light source 400 shown in FIG. 17A; FIG. 17C is a schematic diagram of a light emission effect of the side light source 400 shown in FIG. 17A. As shown in FIGS. 16A to 17C, in some embodiments, the converging structure includes a condenser lens 403.

In some embodiments, optionally, the condenser lens 403 is made of a resin material, may be formed on the driving board 4011 by an injection molding process, and covers the light emitting element 4012.

Referring to FIGS. 16A and 16B, as an alternative embodiment, the condenser lens 403 is a cylindrical lens (extending in the second direction Y), and a shape of a cross section of a surface of the condenser lens 403 away from the light source in a direction perpendicular to the second direction Y is a circular arc.

As a specific example, the shape of the cross section of the condenser lens 403 shown in FIG. 16A in the direction perpendicular to the second direction Y includes a fixing portion 4031, an intermediate portion 4032, and a light adjusting portion 4033, the fixing portion 4031 is located on two opposite sides of the light emitting element in the third direction Z, the intermediate portion 4032 is located between the fixing portion 4031 and the light adjusting portion 4033, the intermediate portion 4032 is rectangular in shape, an edge of the light adjusting portion 4033 close to the intermediate portion 4032 is a line segment in shape, and an edge of the light adjusting portion 4033 away from the intermediate portion 4032 is a circular arc in shape. A length of the intermediate portion 4032 in the third direction Z is H', a length of the intermediate portion 4032 in the first direction X is L', a midpoint of the edge, which is the line segment in shape, of the light adjusting portion 4033 close to the intermediate portion 4032 is denoted as a point O, and a center of a circle of the edge, which is a circular arc in shape, of the light adjusting portion 4033 away from the intermediate portion 4032 is denoted as a point O', and a radius thereof is denoted as R. As a specific scheme, H' is 0.4 mm, L' is 0.1 mm, the point O overlaps with the point O', and R is 0.2 mm.

As another alternative, referring to FIGS. 17A and 17B, a surface of the condenser lens 403 away from the light source is a curved surface formed by arranging a plurality of arc surfaces along the third direction. In this case, the condenser lens 403 is a fresnel lens. A thickness of the condenser lens 403 shown in FIGS. 17A and 17B is smaller than that of the condenser lens 403 shown in FIGS. 16A and 16B.

As a specific example, the shape of the cross section of the surface of the condenser lens 403 away from the light source in the direction perpendicular to the second direction Y is a curve formed by connecting circular arcs and line segments sequentially and alternately, and the curve is an axisymmetric pattern (with respect to a symmetry axis parallel to the first direction X).

As a specific example, the shape of the cross section of the condenser lens 403 shown in FIG. 17A taken along a plane perpendicular to the second direction Y includes the fixing portion 4031, the intermediate portion 4032, and the light adjusting portion 4033, the fixing portion 4031 is located on two opposite sides of the light emitting element in the third direction Z, the intermediate portion 4032 is located between the fixing portion 4031 and the light adjusting portion 4033, the intermediate portion 4032 is rectangular in shape, an edge of the light adjusting portion 4033 close to the intermediate portion 4032 is a line segment in shape, and an edge of the light adjusting portion 4033 away from the intermediate portion 4032 is a curve formed by connecting circular arcs and line segments sequentially and alternately, a complete circular arc may be formed by translating in the first direction X and sequentially connecting all the circular arcs in the curve. A length of the intermediate portion 4032 in the third direction Z is H', a length of the intermediate portion 4032 in the first direction X is L', a midpoint of the edge, which is the line segment in shape, of the light adjusting portion 4033 close to the intermediate portion 4032 is denoted as a point O, and a center of a circle of the edge, which is a circular arc in shape and in the middle, of the light adjusting portion 4033 away from the intermediate portion 4032 is denoted as a point O', and a radius thereof is denoted as R. Furthermore, the edge of the light adjusting portion 4033 away from the intermediate portion 4032 includes 7 circular arcs and 6 line segments which are alternately arranged in the second direction Y, wherein the 7 circular arcs are sequentially arranged in the second direction Y, a first circular arc and a seventh circular arc are axisymmetric, a second circular arc and a sixth circular arc are axisymmetric, a third circular arc and a fifth circular arc are axisymmetric, and a fourth circular arc is axisymmetric. A length of the $i^{th}$ circular arc in the third direction Z is denoted as $H_i$, and i is any of 1 to 7. Specifically, H' is 0.4 mm, L' is 0.1 mm, the point O' is located on the side of the point O away from the light adjusting portion 4033, a line connecting the point O' and the point O is parallel to the first direction X, R is 0.2 mm, $H_1=H_7=11$ µm, $H_2=H_6=33$ µm, $H_3=H_5=66$ µm, and $H_4=340$ µm.

Alternatively, the condenser lens 403 in the embodiment of the present disclosure may also have other shapes, which is not illustrated here.

Figure 18A:
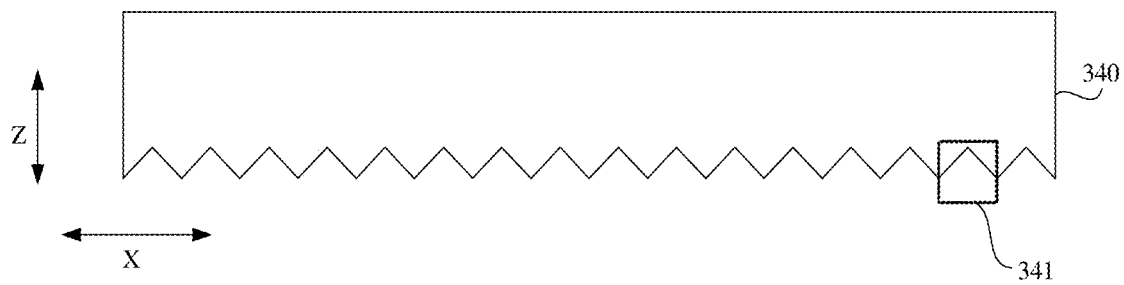
FIG. 18A is a schematic cross-sectional view of a light guide layer according to an embodiment of the present disclosure.
Figure 18B:
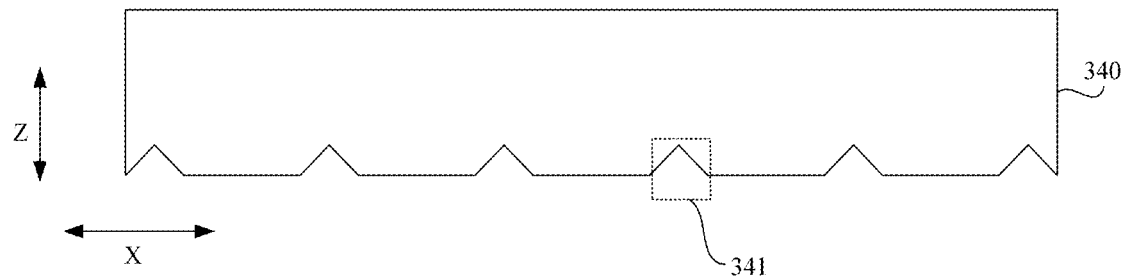
FIG. 18B is another schematic cross-sectional view of a light guide layer according to an embodiment of the present disclosure.
Figure 19A:
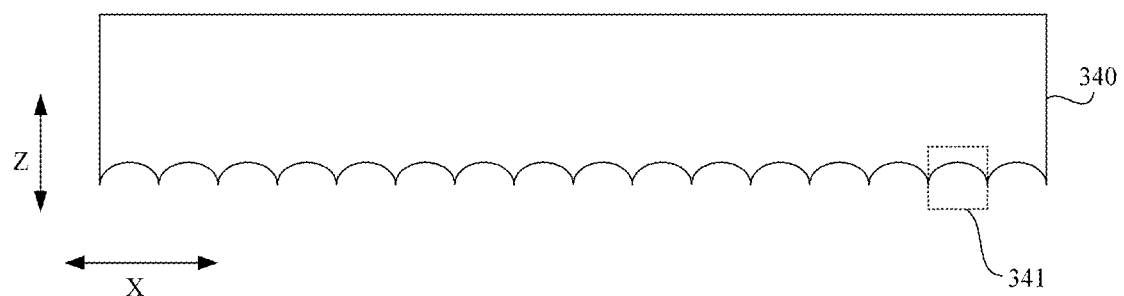
FIG. 19A is another schematic cross-sectional view of a light guide layer according to an embodiment of the present disclosure.
Figure 19B:
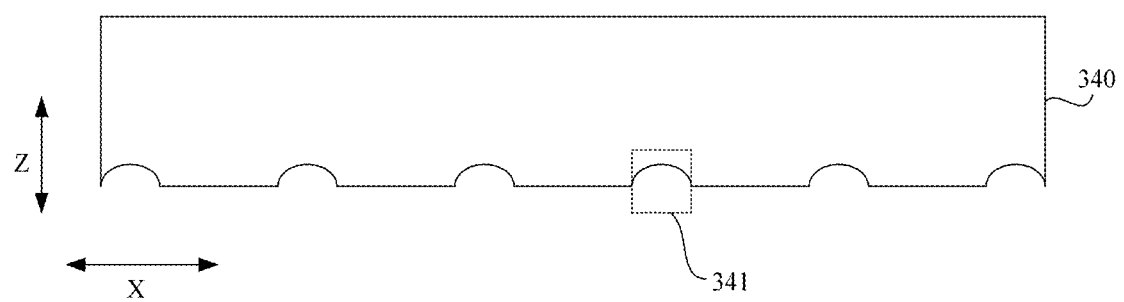
FIG. 19B is another schematic cross-sectional view of a light guide layer according to an embodiment of the present disclosure.

FIG. 18A is a schematic cross-sectional view of a light guide layer according to an embodiment of the present disclosure; FIG. 18B is another schematic cross-sectional view of a light guide layer according to an embodiment of the present disclosure; FIG. 19A is another schematic cross-sectional view of a light guide layer according to an embodiment of the present disclosure; FIG. 19B is another schematic cross-sectional view of a light guide layer according to an embodiment of the present disclosure. As shown in FIGS. 18A to 19B, in some embodiments, a plurality of light converging micro-structures 342 are disposed on a surface of the light guide layer 340 away from the first light adjusting layer 320, and are configured to converge light passing through the light converging micro-structures 342 from the light guide layer 340.

In some embodiments, each light converging micro-structure 342 is a light converging groove formed on the surface of the light guide layer 340 away from the first light adjusting layer 320, and the light converging groove extends along the second direction Y. A cross section of a surface of the light converging groove along a plane perpendicular to the second direction Y is V-shaped or arc-shaped. For example, the cross section of the surface of the light converging groove shown in FIGS. 18A and 18B is V-shaped, and the cross section of the surface of the light converging groove shown in FIGS. 19A and 19B is arc-shaped.

It should be noted that in the embodiment of the present disclosure, any two adjacent light converging grooves may be in contact with each other (for example, as shown in FIG. 18A or FIG. 19A), or may be arranged at intervals (for example, as shown in FIG. 18B or FIG. 19B), or a part of adjacent light converging grooves may be in contact with each other and the other part of adjacent light converging grooves are arranged at intervals. How to arrange the light converging grooves is not limited in the technical scheme of the present disclosure.

It is found through testing that when the light guide layer 340 in the front light source module is provided with the V-shaped light converging micro-structures 342 shown in FIG. 18, the luminance of the display apparatus when presenting a gray scale L255 is about 112.5 nit, and the luminance of the display apparatus when presenting a gray scale L0 is about 6.8 nit, that is, the contrast of the display apparatus is about 16.5. When the light guide layer 340 in the front light source module is not provided with the light converging micro-structures 342 (on a plane parallel to the first direction X and on the surface of the light guide layer 340 away from the first light adjusting layer 320), the luminance of the display apparatus when presenting the gray scale L255 is about 89 nit, and the luminance of the display apparatus when presenting the gray scale L0 is about 5.8 nit, that is, the contrast of the display apparatus is about 15.3.

According to the above data, it is found that the light converging micro-structures 342 are disposed in the light guide layer 340, so that the display brightness and the contrast of the display apparatus can be improved.

In some embodiments, a length L3 of each light converging groove in the first direction X satisfies: L3≤80 µm.

In the embodiment of the present disclosure, a size of each light converging groove is relatively small, and therefore it is difficult to form the light converging groove by a conventional patterning process. Therefore, in the embodiment of the present disclosure, a material of the light guide layer 340 is a nano-imprint material, and the light converging grooves with a small size may be formed by the nano-imprint process.

Figure 20:
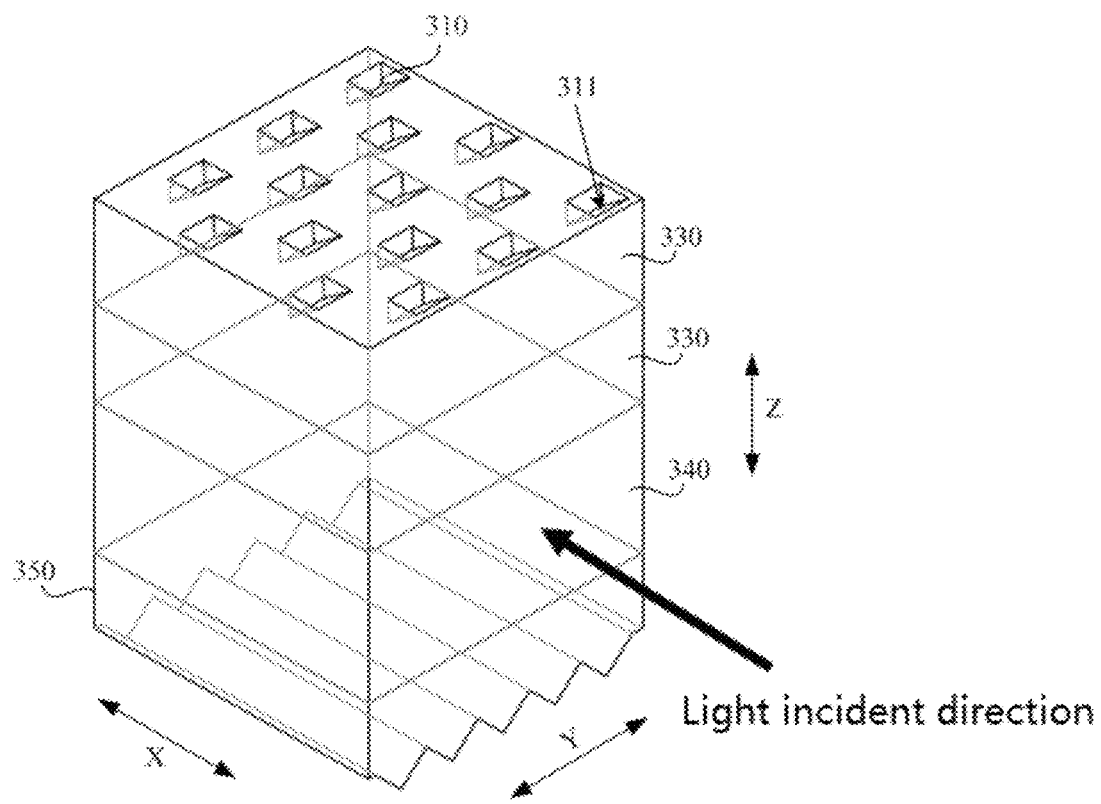
FIG. 20 is a schematic diagram of another structure of a front light source module according to an embodiment of the present disclosure.
Figure 21:
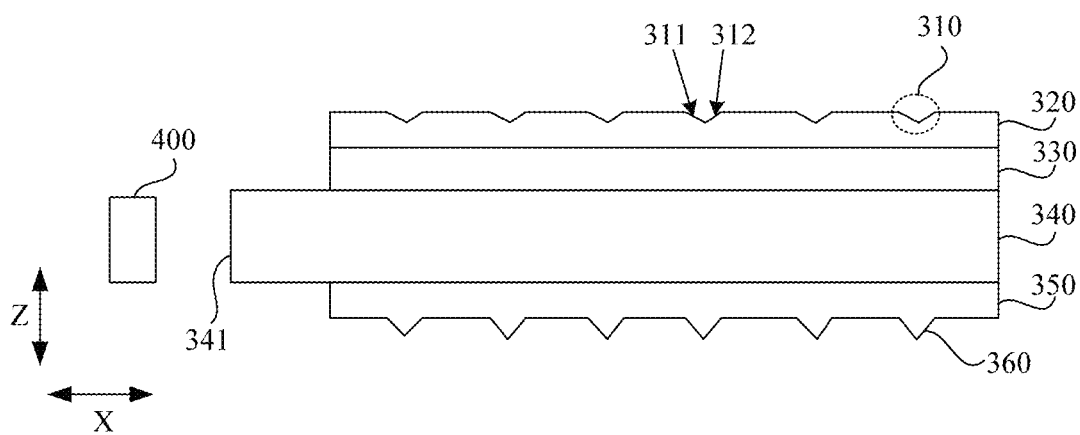
FIG. 21 is a schematic cross-sectional view of another front light source module according to an embodiment of the present disclosure.

FIG. 20 is a schematic diagram of another structure of a front light source module according to an embodiment of the present disclosure; FIG. 21 is a schematic cross-sectional view of another front light source module according to an embodiment of the present disclosure. As shown in FIG. 20 and FIG. 21, in some embodiments, at least one second light adjusting layer 350 is provided on a side of the light guide layer 340 away from the first light adjusting layer 320, the at least one second light adjusting layer 350 and the light guide layer 340 are stacked in the first direction X, and light adjusting micro-structures 360 are disposed on the second light adjusting layer 350 and configured to adjust an exit angle of light emitted from the surface of the light guide layer 340 away from the first light adjusting layer 320 and passing through the light adjusting micro-structures 360.

Figure 22:
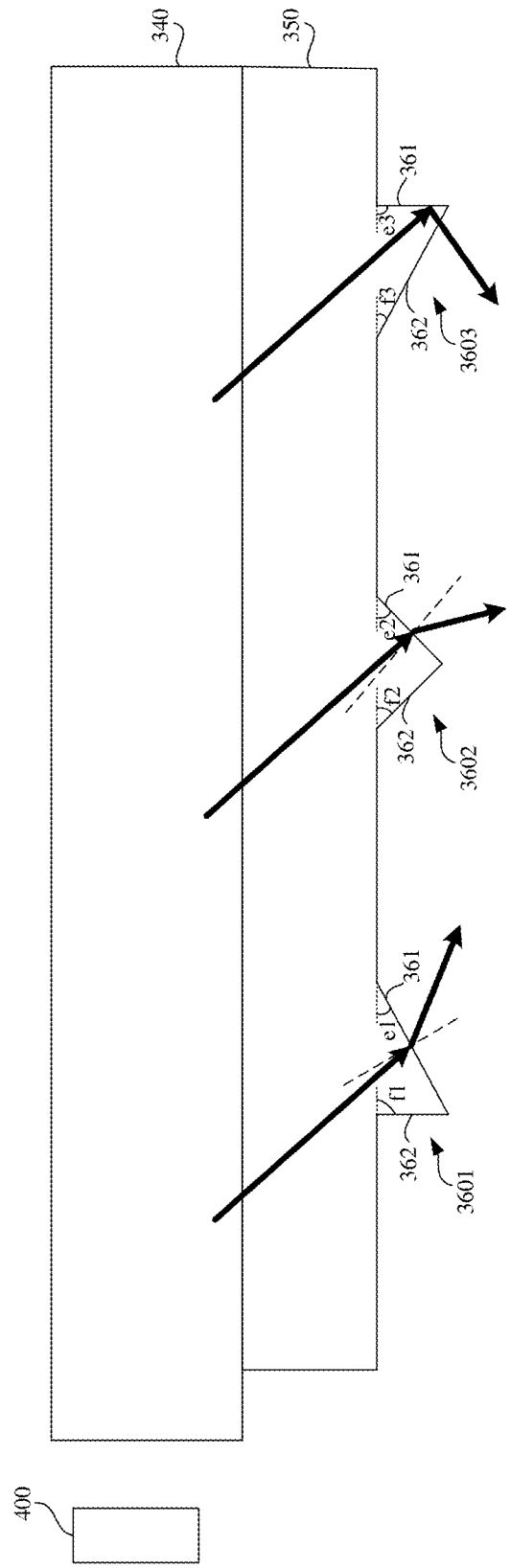
FIG. 22 is a schematic diagram illustrating modulation of light by three different light adjusting micro-structures according to an embodiment of the present disclosure.

FIG. 22 is a schematic diagram illustrating modulation of light by three different light adjusting micro-structures according to an embodiment of the present disclosure. As shown in FIG. 22, the light emitted from the light guide layer 340 away from the first light adjusting layer 320 propagates in a direction away from the plane where the light incident side 341 is located. According to the different light adjusting functions, the light adjusting micro-structures in the present disclosure may be divided into a first light adjusting micro-structure 3601, a second light adjusting micro-structure 3602, and a third light adjusting micro-structure 3603.

The first light adjusting micro-structure 3601 is configured so that the light emitted from the surface of the light guide layer 340 away from the first light adjusting layer 320 and passing through the first light adjusting micro-structure 3601 still propagates in the direction away from the plane where the light incident side 341 is located, but an angle between the light and the third direction Z increases.

The second light adjusting micro-structure 3602 is configured so that the light emitted from the surface of the light guide layer 340 away from the first light adjusting layer 320 and passing through the second light adjusting micro-structure 3602 still propagates in the direction away from the plane where the light incident side 341 is located, but the angle between the light and the third direction Z decreases.

The third light adjusting micro-structure 3603 is configured so that the light emitted from the surface of the light guide layer 340 away from the first light adjusting layer 320 and passing through the third light adjusting micro-structure 3603 propagates in a direction close to the plane where the light incident side 341 is located.

In some embodiments, a cross section of each light adjusting micro-structure taken along a plane perpendicular to the second direction Y is triangular. At this time, the entire light adjusting micro-structure has a triangular prism shape, and an extending direction of the light adjusting micro-structure is parallel to the second direction Y. The triangular prism shape includes a third inclined surface 362 and a fourth inclined surface 361 intersecting with the first direction X, and the third inclined surface 362 is closer to the plane where the light incident side 341 is located than the fourth inclined surface 361. As can be seen from the optical path in FIG. 22, the fourth inclined surface 361 is configured to adjust the exit angle of the light.

An angle e1 between the fourth inclined surface 361 of the first light adjusting micro-structure 3601 and the first direction X is smaller than an angle e2 between the fourth inclined surface 361 of the second light adjusting micro-structure 3602 and the first direction X, and the angle e2 between the fourth inclined surface 361 of the second light adjusting micro-structure 3602 and the first direction X is smaller than an angle e3 between the fourth inclined surface 361 of the third light adjusting micro-structure 3603 and the first direction X. An angle between the third inclined surface 362 in each of the first light adjusting micro-structure 3601, the second light adjusting micro-structure 3602, and the third light adjusting micro-structure 3603 and the first direction X is not limited in the present disclosure. As an alternative, an angle f1 between the third inclined surface 362 in the first light adjusting micro-structure 3601 and the first direction X is greater than an angle f2 between the third inclined surface 362 in the second light adjusting micro-structure 3602 and the first direction X, and the angle f2 between the third inclined surface 362 in the second light adjusting micro-structure 3602 and the first direction X is greater than an angle f3 between the third inclined surface 362 in the third light adjusting micro-structure 3603 and the first direction X.

In the embodiment of the present disclosure, the number of the at least one second light adjusting layer 350 may be 1, 2, 3 or more, and at least one of the first light adjusting micro-structure 3601, the second light adjusting micro-structure 3602 and the third light adjusting micro-structure 3603 may be selectively disposed on each second light adjusting layer 350. The number of the second light adjusting layers 350 and the types of the light adjusting micro-structures disposed on each second light adjusting layer 350 are not limited in the technical solution of the present disclosure.

In some embodiments, a refractive index of the second light adjusting layer 350 closest to the light guide layer 340 is greater than or equal to the refractive index of the light guide layer 340.

In some embodiments, the number of the second light adjusting layers 350 is greater than or equal to 2. A refractive index of one of any two adjacent second light adjusting layers 350 closer to the light guide layer 340 is less than or equal to a refractive index of the other second light adjusting layer 350.

In some embodiments, a first adhesive layer (not shown) is disposed between the second light adjusting layer 350 closest to the light guide layer 340 and the light guide layer 340, and has a refractive index greater than or equal to that of the light guide layer 340 and less than or equal to that of the second light adjusting layer 350 in contact with the first adhesive layer. A second adhesive layer (not shown) is disposed between any two adjacent second light adjusting layers 350, and a refractive index of each second adhesive layer is greater than or equal to a refractive index of the second light adjusting layer 350 in contact with a surface of the second adhesive layer close to the light guide layer 340 and is less than or equal to a refractive index of the second light adjusting layer 350 in contact with a surface of the second adhesive layer away from the light guide layer 340. In this way, the light emitted from the light guide layer 340 toward the reflective display panel 100 is prevented from being totally reflected during the propagation process, so as to ensure the quantity of light reaching the reflective display panel 100.

As an example, in the embodiment of the present disclosure, a thickness of the light guide layer 340 is in a range from 0.2 mm to 0.4 mm, a thickness of the first light adjusting layer 320 is in a range from 0.085 mm to 0.145 mm, a thickness of the first attaching adhesive layer 330 is in a range from 0.05 mm to 0.1 mm, and a thickness of the second light adjusting layer 350 is in a range from 0 mm to 0.2 mm.

In the actual production process, the light guide layer 340 and the first light adjusting layer 320 may be formed respectively. The micro-groove structures 310 in the first light adjusting layer 320 may be formed by a nano-imprint process (generally including molding, imprinting, de-molding and the like). If the light guide layer 340 is provided with the light converging micro-structures, the light converging micro-structures may be formed in the light guide layer 340 through a nano-imprint process, and the light guide layer 340 is then attached and fixed to the first light adjusting layer 320 by the first attaching adhesive layer 330.

Then, the second light adjusting layer 350 is selectively formed according to the requirement, and the second light adjusting layer 350 is fixed to the light guide layer 340.

Based on the same concept, the embodiment of the present disclosure further provides a display apparatus. Referring to FIG. 1, the display apparatus includes: a reflective display panel 100 and a front light source module 300, the front light source module 300 is located on a light outgoing surface of the reflective display panel 100, the front light source module 300 is similar to the front light source module 300 provided in the previous embodiments. For the detailed description of the front light source module 300, reference may be made to the contents in the previous embodiments, which is not repeated herein.

In some embodiments, the reflective display panel 100 includes a plurality of sub-pixel regions arranged in an array along the first direction X and the second direction Y, each sub-pixel region has a length $L_0$ in the first direction X; a length of each micro-groove structure 310 in the first direction X is less than or equal to $\frac{2}{3} \times L_0$, and a length of each micro-groove structure 310 in the second direction Y is less than or equal to $\frac{2}{3} \times L_0$. With this arrangement, each micro-groove structure 310 has a small size, and the micro-groove structures 310 are invisible when the display apparatus is watched (on the front) by human eyes, so that the display effect of the display apparatus is improved.

In some embodiments, the plurality of light converging micro-structures are provided in the surface of the light guide layer 340 away from the first light adjusting layer 320 (see the content in the foregoing embodiments), and are configured to converge the light passing through the light converging micro-structures from the light guide layer 340. A length of each light converging micro-structure in the first direction X is less than or equal to $\frac{2}{3} \times L_0$. With this arrangement, each light converging micro-structure has a small size, and the light converging micro-structures are invisible when the display apparatus is watched (on the front) by human eyes, so that the display effect of the display apparatus is improved.

In some embodiments, at least one second light adjusting layer 350 is provided on a side of the light guide layer 340 away from the first light adjusting layer 320, at least one second light adjusting layer 350 and the light guide layer 340 are stacked in the first direction X, and the light adjusting micro-structures 360 (see the content in the foregoing embodiments) are disposed on the second light adjusting layer 350 and configured to adjust an exit angle of light emitted from the surface of the light guide layer 340 away from the first light adjusting layer 320 and passing through the light adjusting micro-structures 360. A length of each light adjusting micro-structure in the first direction X is less than or equal to $\frac{2}{3} \times L_0$. With this arrangement, each light adjusting micro-structure has a small size, and the light adjusting micro-structures are invisible when the display apparatus is watched (on the front) by human eyes, so that the display effect of the display apparatus is improved.

As an example, when a size of the reflective display panel 100 is 1.5 inches, the length $L_0$ of each sub-pixel region in the first direction X is generally 36 μm. When the size of the reflective display panel 100 is 8 inches, the length $L_0$ of each sub-pixel region in the first direction X is generally 60 μm. When the size of the reflective display panel 100 is 30 inches, the length $L_0$ of each sub-pixel region in the first direction X is generally 80 μm.

Figure 23:
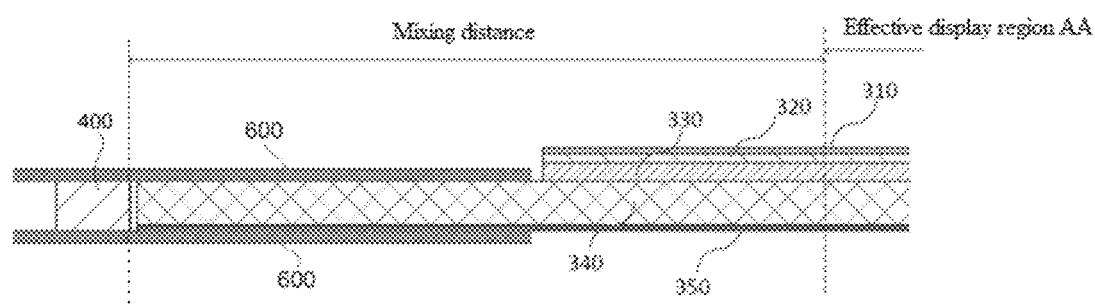
FIG. 23 is a schematic cross-sectional view of a portion of a display apparatus according to an embodiment of the present disclosure.

FIG. 23 is a schematic cross-sectional view of a portion of a display apparatus according to an embodiment of the present disclosure. As shown in FIG. 23, in the embodiment of the present disclosure, by means of the double-layer design of the light guide layer 340 and the first light adjusting layer 320 in the present disclosure, a thickness of the light guide layer 340 (in a range from 0.2 mm to 0.4 mm) may be smaller than a thickness of a single-layer light guide plate (generally greater than 0.4 mm, and about 0.8 mm) in the related art, and due to the reduction of the thickness of the light guide layer 340, a size of the light emitting element disposed on the light guide layer 340 (generally, a length of the light emitting element in the third direction Z is slightly smaller than a length of the light incident side 341 of the light guide layer 340 in the third direction Z) may be correspondingly reduced, so that a distance between two adjacent light emitting elements on a driving backplane may be reduced, and a light mixing distance (a distance from the light emitting element to an effective display region AA of the display apparatus) required by the light emitting elements arranged at intervals may be correspondingly reduced.

In the related art, each light emitting element disposed on the light guide plate with a great thickness have a length of about 1.7 mm and a width of about 1.7 mm, and a required minimum light mixing distance is about 3.6 mm. In the present disclosure, each light emitting element disposed on the light guide layer 340 with a smaller thickness have a length less than 0.56 mm and a width less than 0.56 mm, and a required minimum light mixing distance is about 1.5 mm.

Figure 24:
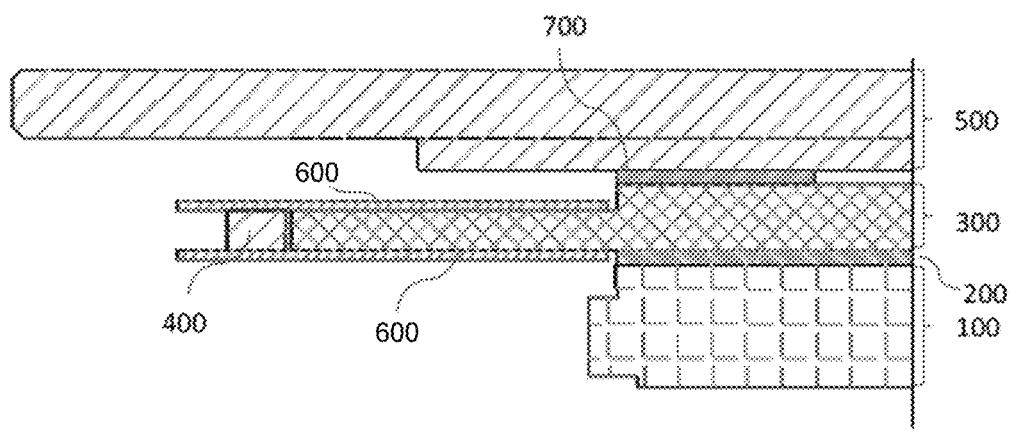
FIG. 24 is another schematic cross-sectional view of a portion of a display apparatus according to an embodiment of the present disclosure.

FIG. 24 is another schematic cross-sectional view of a portion of a display apparatus according to an embodiment of the present disclosure. As shown in FIG. 24, the display apparatus may include not only the reflective display panel 100 and the front light source module 300, but also a touch substrate 500, wherein the touch substrate 500 is located on a side of the front light source module 300 away from the reflective display panel 100, and is fixed to the front light source module 300 through a foam tape 700, so that the display apparatus has a touch function.

In addition, in some embodiments, a reflection tape 600 may be used to fix the side light source 400 and the light guide layer 340, so that the side light source 400 and the light guide layer 340 may be fixed, and it can be ensured that the light cannot be emitted from an upper surface and a lower surface of the light guide layer 340 in the light mixing process, thereby improving the light utilization rate.

In some embodiments, the front light source module 300 is attached to the reflective display panel 100 through a second attaching adhesive layer 200, and a refractive index of a portion of the front light source module 300 in contact with the second attaching adhesive layer 200 is greater than a refractive index of the second attaching adhesive layer 200. For example, when the front light source module 300 does not include the second light adjusting layer 350, the light guide layer 340 is fixed to the reflective display panel 100 through the second attaching adhesive layer 200. When the front light source module 300 includes the second light adjusting layer 350, the second light adjusting layer 350 is fixed to the reflective display panel 100 through the second attaching adhesive layer 200.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A front light source module, comprising:
a side light source;
a light guide layer comprising a light incident side opposite to the side light source in a first direction; and
a first light adjusting layer, wherein the first light adjusting layer and the light guide layer are stacked in a third direction, a side of the first light adjusting layer away from the light guide layer is provided with a plurality of micro-groove structures, each micro-groove structure comprises: a first inclined surface and a second inclined surface opposite to each other in the first direction, the first inclined surface is configured to face the light incident side and is closer to the light incident side than the second inclined surface, an angle α between the first inclined surface and a plane where a surface of the first light adjusting layer away from the light guide layer is located is in a range from 26° to 42°, and a depth H of each micro-groove structure is in a range from 4 μm to 15 μm;
wherein a refractive index of the first light adjusting layer is greater than or equal to that of the light guide layer;
wherein a distribution density of the plurality of micro-groove structures increases gradually in a direction away from the light incident side along the first direction;
wherein the surface of the first light adjusting layer away from the light guide layer is divided into a plurality of groove structure arrangement regions arranged along the first direction;
a distance between every two adjacent groove structure arrangement regions gradually decreases in the direction away from the light incident side along the first direction;
each groove structure arrangement region is divided into a plurality of rectangular periodic regions arranged in a second direction; a length of each rectangular periodic region in the first direction is R, and a length of each rectangular periodic region in the second direction is Q, and the second direction is perpendicular to both the first direction and the third direction;
M micro-groove structures are uniformly arranged in each rectangular periodic region; and wherein the M micro-groove structures are arranged in each rectangular periodic region to satisfy: a distance between centers of any two micro-groove structures in the first direction is greater than or equal to R/M, and a distance between centers of any two micro-groove structures in the second direction is greater than or equal to Q/M.

2. The front light source module of claim 1, wherein a length of an opening of each micro-groove structure in the surface of the first light adjusting layer away from the light guide layer in the first direction is $L_1$; and
a ratio of L1 to H is L1/H, which satisfies: $L_1/H \leq 4$.

3. The front light source module of claim 2, wherein $L_1$ satisfies $L_1 \leq 80$ μm.

4. The front light source module of claim 1, wherein the first inclined surface is rectangular, a pair of opposite sides of the rectangular first inclined surface extend along a second direction, and the second direction is perpendicular to both the first direction and the third direction; and
an extending direction of the other pair of opposite sides of the rectangular first inclined surface is perpendicular to the third direction, and intersects with both the first direction and the second direction; and
a length $L_2$ of a side of the rectangular first inclined surface extending in the second direction satisfies: $L_2 \leq 80$ μm.

5. The front light source module of claim 1, wherein the first light adjusting layer is attached to the light guide layer by a first attaching adhesive layer, and a refractive index of the first attaching adhesive layer is greater than or equal to the refractive index of the light guide layer and is less than or equal to a refractive index of the first light adjusting layer.

6. The front light source module of claim 1, wherein a shape of a cross section of each micro-groove structure taken along a plane parallel to the first direction and parallel to the third direction comprises: a triangle or a quadrilateral; and
wherein the second inclined surface is a flat surface or a curved surface.

7. The front light source module of claim 1, wherein the side light source comprises:
a light source; and
a converging structure between the light source and the light incident side and configured to converge the light emitted from the light source, wherein an angle θ1 between light emitted from the converging structure and a first reference plane satisfies: θ1≤52.4°, and
the first reference plane is a plane perpendicular to the third direction.

8. The front light source module of claim 7, wherein the converging structure comprises: a wedge-shaped light guiding structure;
the wedge-shaped light guiding structure comprises: a first light incident surface, a first light outgoing surface, a first light adjusting surface and a second light adjusting surface;
the first light incident surface and the first light outgoing surface are opposite to each other in the first direction, the first light incident surface and the first light outgoing surface are perpendicular to the first direction, a length of the first light incident surface in the third direction is T1, a length of the first light outgoing surface in the third direction is T2, T2>T1, and an orthographic projection of the first light outgoing surface on a plane where the first light incident surface is located covers the first light incident surface;
the first light adjusting surface and the second light adjusting surface are opposite to each other in the third direction, and a distance between the first light adjusting surface and the second light adjusting surface in the third direction is gradually increased in a direction from the first light incident surface to the first light outgoing surface along the first direction; and
the light source is opposite to the first light incident surface, and the light incident side is opposite to the first light outgoing surface.

9. The front light source module of claim 8, wherein the light source comprises: a driving board and a light emitting element fixed onto the driving board, a length T of the light emitting element in the third direction is smaller than the length T1 of the first light incident surface in the third direction; and
an orthographic projection of the light emitting element on the plane where the first light incident surface is located in a region defined by the first light incident surface;
the length T of the light emitting element in the third direction satisfies: T≤0.3 mm.

10. The front light source module of claim 7, wherein the converging structure comprises a condenser lens;
a shape of a cross section, taken along a plane perpendicular to the second direction, of a surface of the condenser lens away from the light source is a circular arc; or a shape of a cross section, taken along a plane perpendicular to the second direction, of a surface of the condenser lens away from the light source is a curve formed by connecting circular arcs and line segments sequentially and alternately; and
the light source comprises: a driving board and a light emitting element fixed onto the driving board, and the condenser lens is arranged on the driving board and covers the light emitting element.

11. The front light source module of claim 1, further comprising a plurality of light converging micro-structures on a surface of the light guide layer away from the first light adjusting layer, and configured to converge light passing through the plurality of light converging micro-structures from the light guide layer.

12. The front light source module of claim 11, wherein each light converging micro-structure is a light converging groove on the surface of the light guide layer away from the first light adjusting layer, and the light converging groove extends along the second direction; and
a cross section of a surface of the light converging groove taken along a plane perpendicular to the second direction Y is V-shaped or arc-shaped; and
a length $L_3$ of the light converging groove in the first direction satisfies: $L_3 \leq 80$ μm.

13. The front light source module of claim 8, wherein the wedge-shaped light guiding structure and the light guide layer are made of a same material and have a one-piece structure; and
the light incident side and the first light outgoing surface are a same surface.

14. A front light source module, comprising:
a side light source;
a light guide layer comprising a light incident side opposite to the side light source in a first direction; and
a first light adjusting layer, wherein the first light adjusting layer and the light guide layer are stacked in a third direction, a side of the first light adjusting layer away from the light guide layer is provided with a plurality of micro-groove structures, each micro-groove structure comprises: a first inclined surface and a second inclined surface opposite to each other in the first direction, the first inclined surface is configured to face the light incident side and is closer to the light incident side than the second inclined surface, an angle a between the first inclined surface and a plane where a surface of the first light adjusting layer away from the light guide layer is located is in a range from 26° to 42°, and a depth H of each micro-groove structure is in a range from 4 μm to 15 μm;

wherein a refractive index of the first light adjusting layer is greater than or equal to that of the light guide layer;

the front light source module further comprises at least one second light adjusting layer on a side of the light guide layer away from the first light adjusting layer, wherein the at least one second light adjusting layer and the light guide layer are stacked in the third direction, and the at least one second light adjusting layer comprises light adjusting micro-structures thereon and configured to adjust an exit angle of light emitted from the surface of the light guide layer away from the first light adjusting layer and passing through the light adjusting micro-structures;

wherein a refractive index of a second light adjusting layer of the at least one second light adjusting layer closest to the light guide layer is greater than or equal to a refractive index of the light guide layer; and wherein the at least one second light adjusting layer comprises two or more second light adjusting layers; and a refractive index of one of any two adjacent second light adjusting layers closer to the light guide layer is less than or equal to a refractive index of the other second light adjusting layer; and wherein the light emitted from the surface of the light guide layer away from the first light adjusting layer propagates in a direction away from a plane where the light incident side is located;

the light adjusting micro-structures arranged on the at least one second light adjusting layer comprise: a first light adjusting micro-structure configured to adjust the light so that the light emitted from the surface of the light guide layer away from the first light adjusting layer and passing through the first light adjusting micro-structure still propagates in the direction away from the plane where the light incident side is located, but an angle between the light and the third direction increases; and/or the light adjusting micro-structures arranged on the at least one second light adjusting layer comprise: a second light adjusting micro-structure configured to adjust the light so that the light emitted from the surface of the light guide layer away from the first light adjusting layer and passing through the second light adjusting micro-structure still propagates in the direction away from the plane where the light incident side is located, but the angle between the light and the third direction decreases; and/or the light adjusting micro-structures arranged on the at least one second light adjusting layer comprise: a third light adjusting micro-structure configured to adjust the light so that the light emitted from the surface of the light guide layer away from the first light adjusting layer and passing through the third light adjusting micro-structure propagates in a direction close to the plane where the light incident side is located.

15. A display apparatus, comprising: a reflective display panel and a front light source module, wherein the front light source module is on a light outgoing surface of the reflective display panel;

the front light source module comprises:

a side light source;

a light guide layer comprising a light incident side opposite to the side light source in a first direction; and a first light adjusting layer, wherein the first light adjusting layer and the light guide layer are stacked in a third direction, a side of the first light adjusting layer away from the light guide layer is provided with a plurality of micro-groove structures, each micro-groove structure comprises: a first inclined surface and a second inclined surface opposite to each other in the first direction, the first inclined surface is configured to face the light incident side and is closer to the light incident side than the second inclined surface, an angle a between the first inclined surface and a plane where a surface of the first light adjusting layer away from the light guide layer is located is in a range from 26° to 42°, and a depth H of each micro-groove structure is in a range from 4 μm to 15 μm;

wherein a refractive index of the first light adjusting layer is greater than or equal to that of the light guide layer; and wherein the reflective display panel comprises a plurality of sub-pixel regions arranged in an array along a first direction and a second direction, and each sub-pixel region has a length $L_0$ in the first direction; and a length of each micro-groove structure in the first direction is less than or equal to $\frac{2}{3} \times L_0$, and a length of each micro-groove structure in the second direction is less than or equal to $\frac{2}{3} \times L_0$;

the display apparatus further comprises a plurality of light converging micro-structures on a surface of the light guide layer away from the first light adjusting layer, and configured to converge light passing through the plurality of light converging micro-structures from the light guide layer;

wherein a length of each light converging micro-structure in the first direction is less than or equal to $\frac{2}{3} \times L_0$; and the display apparatus further comprises at least one second light adjusting layer on a side of the light guide layer away from the first light adjusting layer, wherein the at least one second light adjusting layer and the light guide layer are stacked in the first direction, and the at least one second light adjusting layer comprises light adjusting micro-structures thereon and configured to adjust an exit angle of light emitted from the surface of the light guide layer away from the first light adjusting layer and passing through the light adjusting micro-structures;

wherein a length of each light adjusting micro-structure in the first direction is less than or equal to $\frac{2}{3} \times L_0$.

16. The display apparatus of claim 15, wherein the front light source module and the reflective display panel are attached to each other by a second attaching adhesive layer; and a refractive index of a portion of the front light source module in contact with the second attaching adhesive layer is greater than a refractive index of the second attaching adhesive layer.

* * * * *